United States Patent [19]

Mosier

[11] 4,041,283
[45] Aug. 9, 1977

[54] RAILWAY TRAIN CONTROL SIMULATOR AND METHOD

[75] Inventor: John E. Mosier, Duncan, Okla.

[73] Assignee: Halliburton Company, Duncan, Okla.

[21] Appl. No.: 719,331

[22] Filed: Aug. 31, 1976

Related U.S. Application Data

[63] Continuation-in-part of Ser. No. 599,043, July 25, 1975, which is a continuation of Ser. No. 436,700, Jan. 25, 1974, abandoned.

[51] Int. Cl.² .................. G05B 17/00; G05D 1/00
[52] U.S. Cl. .................... 235/150.2; 105/61; 246/167 R; 364/300
[58] Field of Search ........... 235/150.2, 150.24, 150.26; 105/61; 246/124, 167 R; 340/47, 366 CA; 444/1

[56] References Cited

U.S. PATENT DOCUMENTS

| | | | |
|---|---|---|---|
| 3,240,929 | 3/1966 | Hughson | 246/167 |
| 3,639,731 | 2/1972 | McNeill | 235/150.2 X |
| 3,655,962 | 4/1972 | Koch | 235/150.2 X |
| 3,696,758 | 10/1972 | Godinez, Jr. | 105/61 |

Primary Examiner—Edward J. Wise
Attorney, Agent, or Firm—Burns, Doane, Swecker & Mathis

[57] ABSTRACT

A method and apparatus for simulating operation and control of a railway train having at least one locomotive in a locomotive set and a plurality of articulated cars. A simulator control station including a train speed control throttle and a train braking controller provides signals related to the degree of operation of the throttle and braking controller.

Information relating to car consist, track profile and simulated train location for a predetermined section of track are provided together with data related to the simulated locomotive tractive effort and train braking. Coupling forces between each car throughout the extent of the train are calculated from the data and displayed at the simulator control station to enable a simulator control station operator to control the throttle and braking controller in response to the displayed coupling forces and thereby simulate operation and control of the train. Brake pressure distribution along the length of the train is also displayed.

20 Claims, 22 Drawing Figures

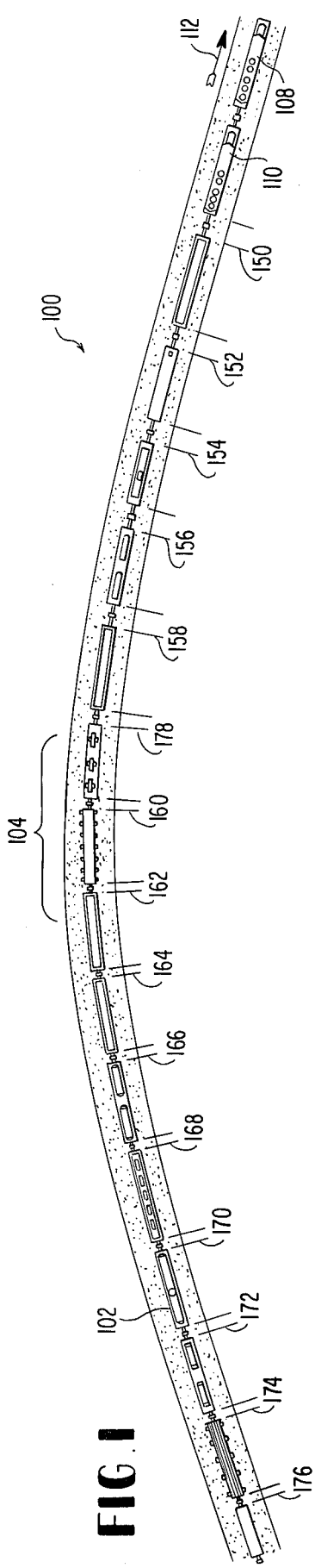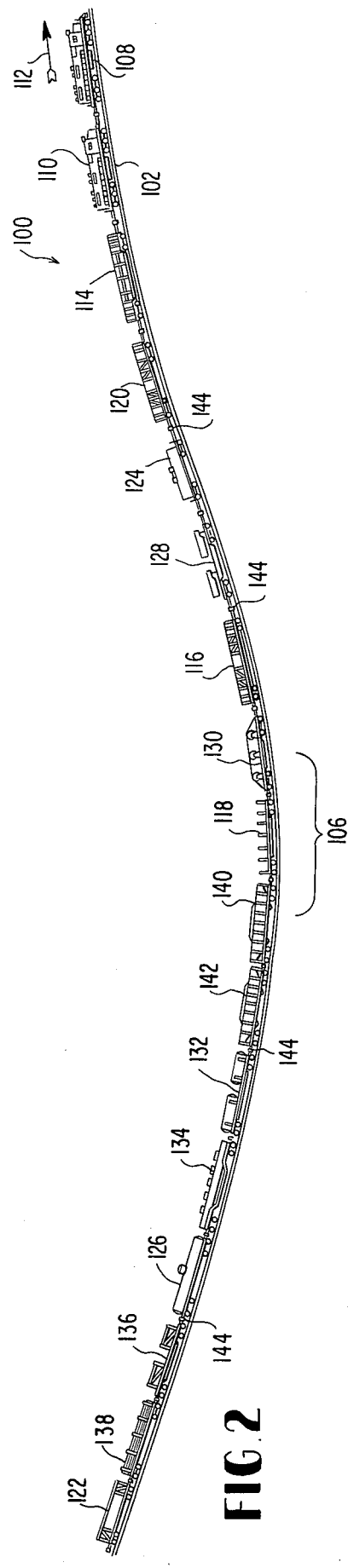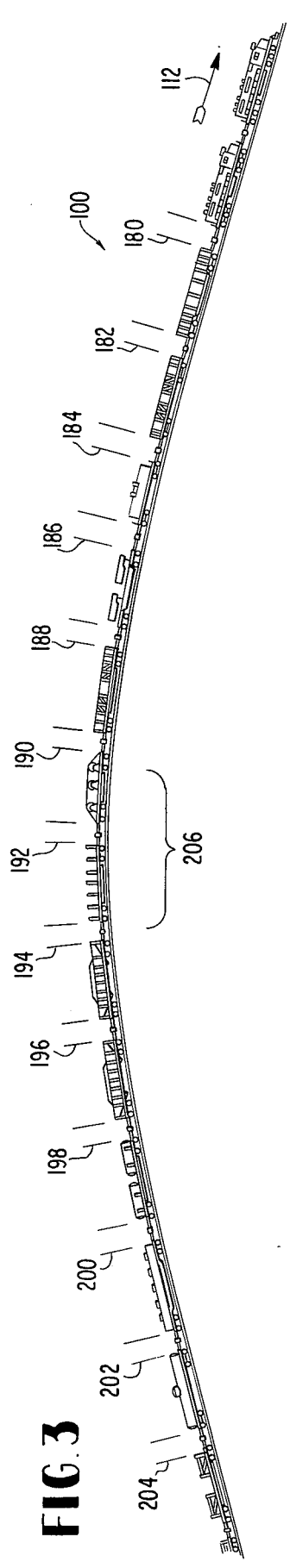

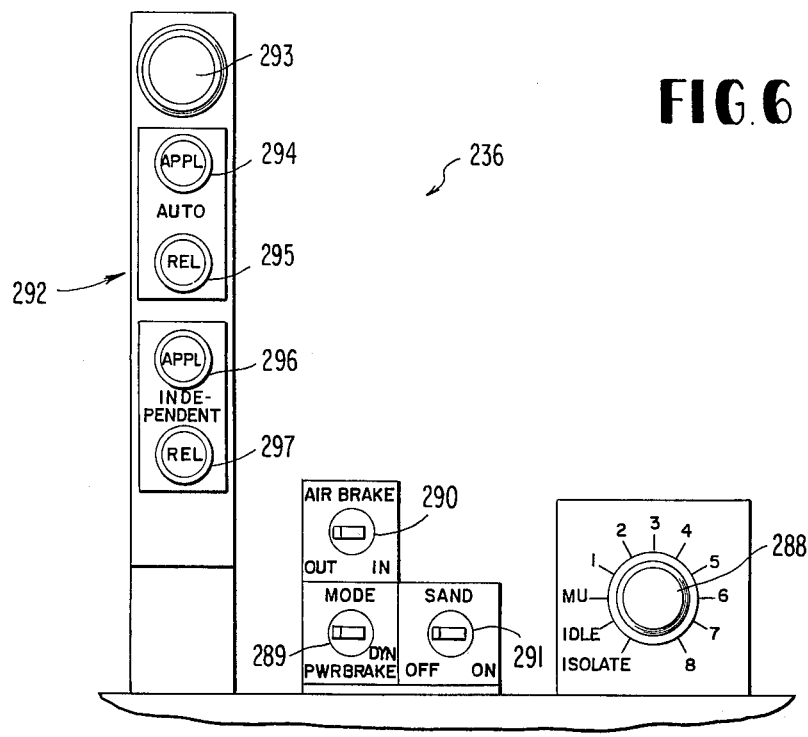
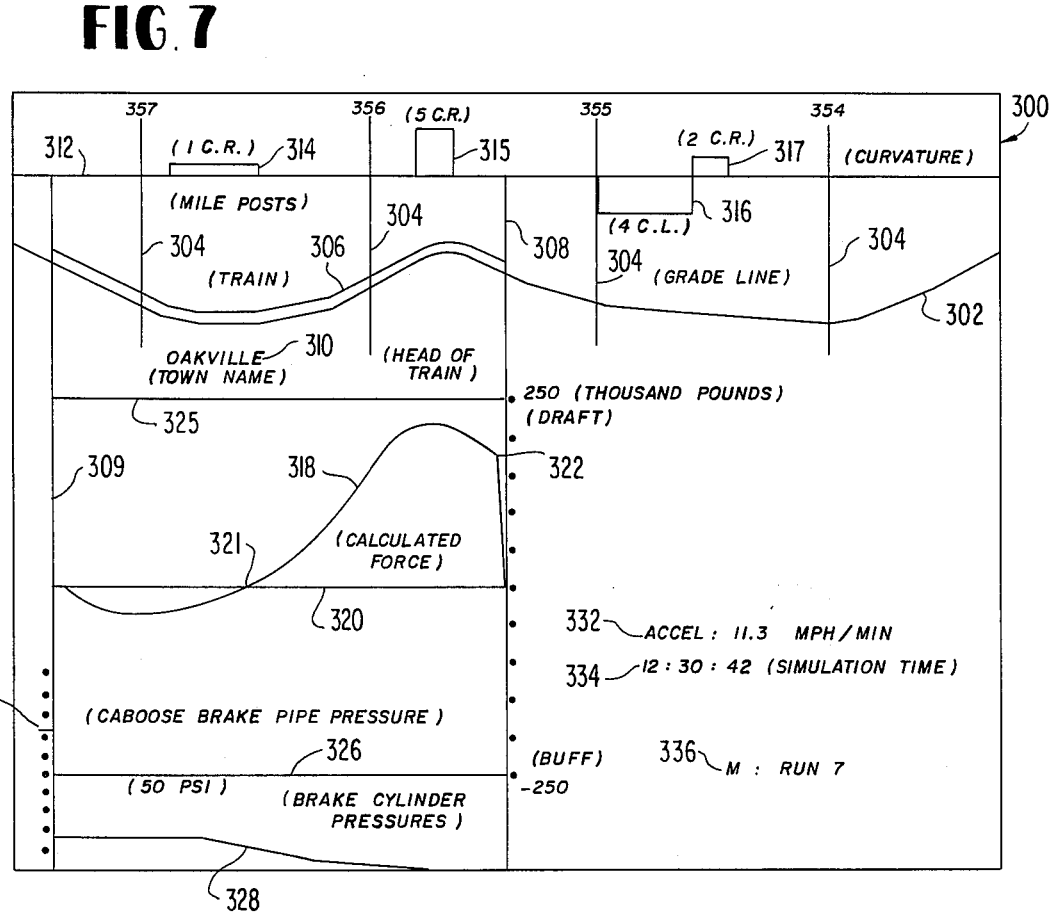

```
      HG-09
   110 CARS
    57 EMPTIES
    53 LOADS
  6607 FEET
  6871 NET TON
  7434 GROSS TON
  2957 LADING TON
  9000 HP
  1.21 HP/TON
    65 TONS/BRK
  0.42 NET BR
```

ACCEL: -8.7 MPH/MIN
00:19:37

H: D 8 4

ACCEL: -85.3 MPH/MIN
00:52:51

H: IDLE

ACCEL: -2.1 MPH/MIN
00:05:40

H: RUN 5
R: RUN 5

ACCEL: -18.6 MPH/MIN
00:15:37

H: IDLE
R: IDLE

RAILWAY TRAIN CONTROL SIMULATOR AND METHOD

RELATED APPLICATIONS

This application is a continuation-in-part of copending United States patent application Ser. No. 599,043 filed July 25, 1975 which is a continuation of United States patent application Ser. No. 436,700 filed Jan. 25, 1974, now abandoned.

BACKGROUND OF THE INVENTION

This invention pertains to a method and apparatus for simulating the operation and control of railway trains. More specifically, the invention comprises a novel method and apparatus for simulating longitudinal train dynamics, e.g., car presence upon an underlying track profile, and calculating simulated car coupler forces throughout the extent of a train for simulated operational data. The invention provides an informational base for planning and operating trains with optimum performance and for training personnel and evaluating the performance of the trainee over a predetermined simulated route of travel.

In the infant stages of railroad technology locomotive pulling capabilities limited the length of trains to a few cars, such as 10 to 20, with corresponding relatively low maximum speeds on the order of 20 to 30 miles an hour. During this era even novice locomotive enginemen had little difficulty in controlling a train. In this connection the entire train could be effectively monitored merely by rearward observation from the locomotive cab. Efficiency around curves and on grades, as tempered by safe operational procedure, could be quickly acquired by a "seat of the pants"feel since the entire train essentially acted as a single unit wherein grade and curvature effects produced upon the locomotive were in essence concomitantly applied to the entire, relatively short, train.

Over the years, however, advances in railway engineering, such as the development of diesel electric locomotives utilized in multiple unit consists have advanced pulling capacities several magnitudes with respect to the early wood burning steam drive systems. This increase in pulling capacity has permitted marshaling longer and longer trains with higher and higher tonnage. It is no longer uncommon to encounter train consists of one hundred and fifty to two hundred cars stretching over a length of one, one and one-half to two miles.

In addition to the foregoing increases in train length and tonnage, a desire for increased operating efficiency has pushed operating speeds upward.

Unfortunately, with the foregoing noted increase in train lengths, tonnage and operating speeds, locomotive operational control equipment has remained substantially unchanged. In this connection enginemen still are operating trains to a large extent based upon a "seat of the pants" feel.

While experience and feel for train operational forces have remained the standard of the industry, efficiency can only be acquired after many years of experience over a well known run. In this regard it will readily be appreciated that human sensory perceptions as to grades, curves, etc. within a locomotive have little relevance to the end of a train 1 or 2 miles away. Further, gentle grades are often imperceptible to an engineman, although with long train lengths, high tonnage and elevated speeds, significant coupling forces may be produced between adjacent cars even on gentle grades.

It would therefore be highly desirable to provide a method and apparatus for simulating train handling operations which would present a locomotive engineer or engineman with an accurate appreciation of track profile and relative train presence throughout the extent of the train for operation along a predetermined route of travel. With this basic information available, it should be possible for even a relatively novice engineman, totally unfamiliar with the terrain of a particular run, to be trained to efficiently utilize grades to maintain optimum speeds and slack conditions along the route of travel.

It would also be desirable to provide a method and apparatus which simulates all real life variables experienced in actual train operation to facilitate analysis of train handling operations by train management personnel to achieve maximum safety, economy and efficiency. For optimum train handling operations, it is extremely important to determine the best way to make up and operate trains especially over the more difficult track profiles to be encountered. Further, it is highly desirable to provide a convenient system, apart from actual train operation, for training engineers to operate trains at peak performance.

The above noted control difficulties are greatly accentuated when dynamic "train action" forces are considered. In this regard, train action or slack action events may be defined as a phenomenon which occurs as a consequence of the existence of slack in couplings between moving railway units. Such slack enables the units, during system travel, to undergo relative movement. Thus, train action denotes the equalization of speed of adjacent units which have undergone relative movement. A train action event is termed a "run-out" where adjacent units are moving apart. Where adjacent units are converging, the train action event is termed a "run-in."

There are numerous undesirable aspects associated with train action phenomena. During train action events shock forces are transmitted through the coupling units. These shock forces are propagated in a more or less wave form through the train. Such train action induced shocks are frequently severe enough to both damage goods carried by the trains and cause injury to train crewmen. Indeed, train action induced forces may be severe enough to induce car partings and in some circumstances even derailment.

In the recent past, significant advances have been achieved in terms of obviating or minimizing the severity of slack action forces by the development of hydraulic cushioning units operable to be connected in series with car coupler shanks. Examples of such hydraulic cushioning units are disclosed in U.S. Seay Pat. No. 3,301,410, U.S. Blake Pat. No. 3,463,328, U.S. Seay Pat. No. 3,589,527, and U.S. Stephenson Pat. No. 3,589,528, all assigned to the assignee of the subject invention.

Notwithstanding, however, singular advances provided the railway industry by the development of hydraulic cushioning units, room for significant improvement remains in dealing with train action events.

A method and apparatus for dynamically determining coupling forces throughout a train of widely varying consist as the train actually proceeds along a predetermined route of travel is disclosed and claimed in copending United States Application Ser. No. 599,043, filed July 25, 1975, by John E. Mosier for "Method and Apparatus for Facilitating Control of a Railway Train", the disclosure of which is hereby incorporated herein by reference. With such force profile data an engineman may anticipate train action events so that appropriate preventive locomotive control may be initiated through appropriate application of the locomotive throttle, locomotive dynamic brakes, locomotive independent air brakes and/or automatic train brakes.

The present invention represents an adaptation of the previously disclosed system to provide a simulation of actual train handling operations which facilitates analysis and planning of operations to anticipate train action events and the training of personnel to avoid the problems associated with such events.

OBJECTS AND BRIEF SUMMARY OF THE INVENTION

Objects of the Invention

It is an object of the invention to provide a novel method and apparatus for simulating operational control of a railway train to enable optimum train operatons to be determined.

It is still a further object of the invention to provide a novel method and apparatus wherein operational control of a train may be simulated over a widely varying terrain.

It is yet a further object of the invention to provide a novel method and apparatus wherein a relatively inexperienced engineman may learn to effectively handle long trains even with widely varying consists.

It is yet another object of the invention to provide a novel method and apparatus wherein a locomotive engineman may learn to improve performance of the train with reduced fuel consumption by optimizing the utilization of grades in achieving speed maintenance of the train.

It is another object of the invention to provide a novel method and apparatus wherein train operational indicia may be disclosed in substantial real time to an operator at a simulator control station whereby operation of the train may be effectively simulated.

It is still another object of the invention to provide a novel method and apparatus for simulating operational control of a train to facilitate training of personnel to achieve safe and reliable operation of a train wherein the tendency for train partings and derailments are effectively minimized.

It is still yet another object of the invention to provide a novel method and apparatus for simulating operational control of a train wherein coupling forces throughout the length of the train may be dynamically calculated along a predetermined route of travel.

It is yet still another object of the invention to provide a novel method and apparatus for dynamically displaying a simulated real time train presence upon an underlying track profile and displaying coupling force and brake pressure profiles throughout the extent of a train along a predetermined route of travel.

It is yet a further object of the invention to provide a novel method and apparatus for recording and storing operational parameters of a simulated train in operation along a predetermined route of travel.

BRIEF SUMMARY

In a method for simulating operation and control of a train according to a preferred embodiment of the invention, intended to accomplish at least some of the foregoing objects, a simulator station is provided including a train speed control throttle and a train braking controller each providing a signal related to the degree of operation thereof by a simulator control station operator. Data is provided related to track profile, train consist, and the location of the train on the track for a predetermined train and for a predetermined section of track over which the operation of the train is to be simulated. In addition, data related to locomotive tractive effort and train braking is provided in response to the signals from the control throttle and the train braking controller. The coupling forces between each of a plurality of adjacent cars in the train are calculated from the provided data. The plurality of calculated coupling forces are displayed to the simulator control station operator relative to the position in the train of the cars for which the calculations are made whereby operation and control of the railway trains is simulated. Preferably, the method may include the step of displaying to the simulator control station operator the brake pressure distribution along the train in response to operation of the train braking controller. The operator can actuate the throttle and brake controller in response to the displayed coupling forces to simulate control of the operation of at least one locomotive.

The apparatus according to a preferred embodiment of the invention comprises a simulator control station including a train speed control throttle and a train braking controller each providing a signal related to the degree of operation thereof by a simulator control station operator. The apparatus includes means for providing data related to track profile, train consist, and the location of the train on the track for a predetermined train and for a predetermined section of track over which the operation of the train is to be simulated. It also includes means for providing data related to locomotive tractive effort and train braking in response to the signals from the control throttle and the train braking controller. In addition, means is provided for calculating from the provided data the coupling forces between each of a plurality of adjacent cars in the train. A general purpose digital computer may be provided to receive the data related to track profile, train consist, and train location and the data related to locomotive tractive effort and train braking for calculating the coupling forces throughout the extent of the train. Further, the apparatus includes means for displaying to the simulator control station operator each of a plurality of the calculated coupling forces relative to the position in the train of the cars for which the calculations are made whereby operation and control of the railway train is simulated. For example, an electronic display screen may be provided to receive signals from the computer and generate traces of track profile, train presence upon the track profile, car coupler force distribution and other train information and operational instructions as desired.

The method and apparatus of the present invention achieve a system for simulating train handling operations which provides at least the following advantageous functions:

1. Development of optimum train handling procedures for various sections of railroad track.

2. Improvement of train marshaling for better weight distribution along length of train.

3. Assistance in derailment investigations by recreating actual operating conditions.

4. Optimization of power requirements for improved train handling and fuel economy.

5. Determination of best location of slave locomotives along length of train.

6. Demonstration to both trainees and experienced trainmen of the real-time effects of various train handling procedures.

7. Improvement in braking procedures by demonstrating effects of brake application on car coupler force distribution.

THE DRAWINGS

Further objects and advantages of the invention will become apparent from the following detailed description taken in conjunction with the accompanying drawings, wherein:

FIG. 1 is a schematic plan view of a train to be simulated including a locomotive set and a plurality of articulated cars coupled thereto composed of a widely varying consist;

FIG. 2 is a side elevational view of the train depicted in FIG. 1 and particularly discloses the train passing through a track grade depression wherein ascending cars are stretched and in tension while descending cars are bunched and in compression;

FIG. 3 is a side elevational view of the train depicted in FIGS. 1 and 2 as the train is proceeding over a knoll wherein descending cars are stretched and in tension and ascending cars are in like manner stretched and in tension;

Fig. 6 illustrates a remote locomotive control unit incorporated in the simulator;

Figure 8:
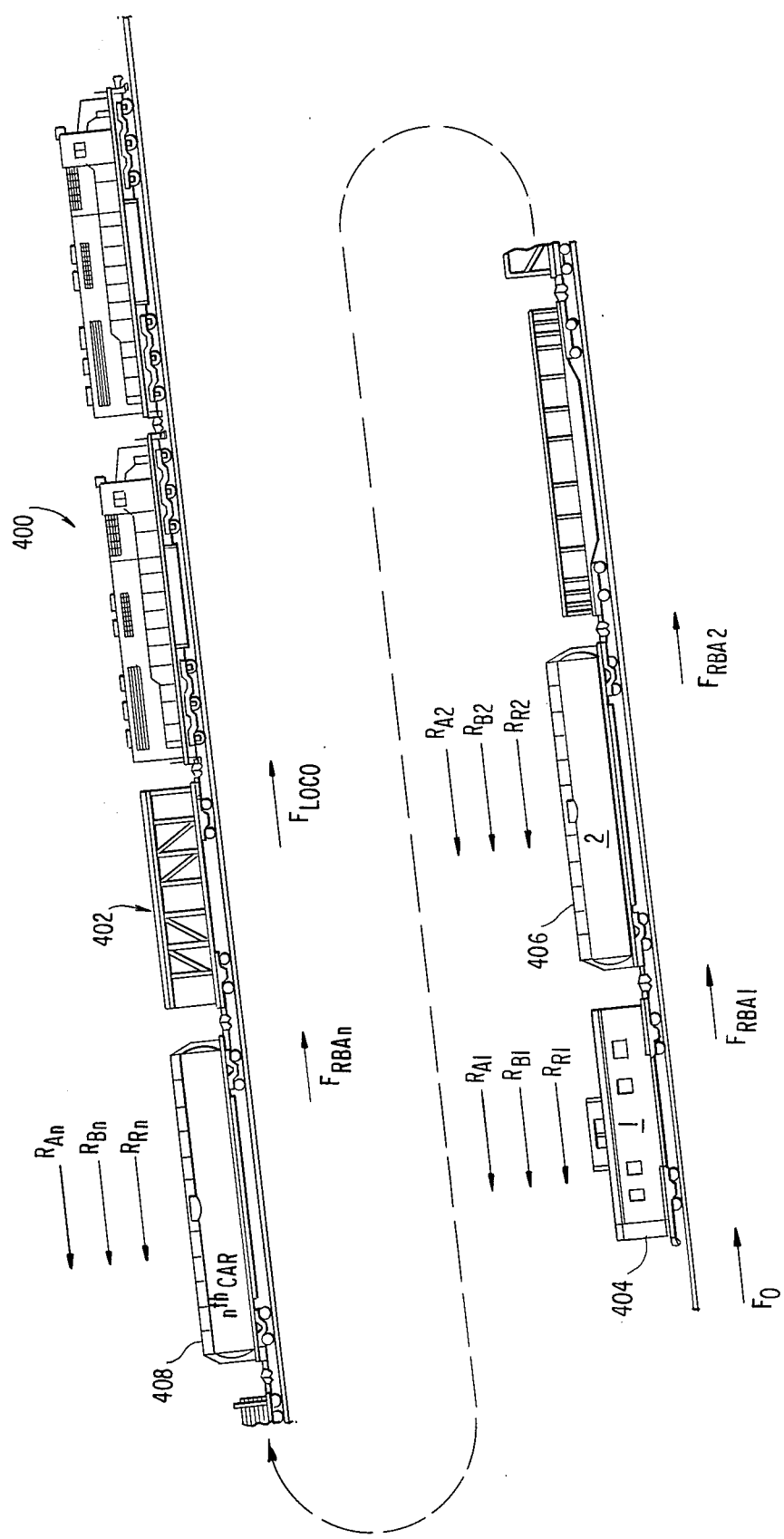
Figure 9:
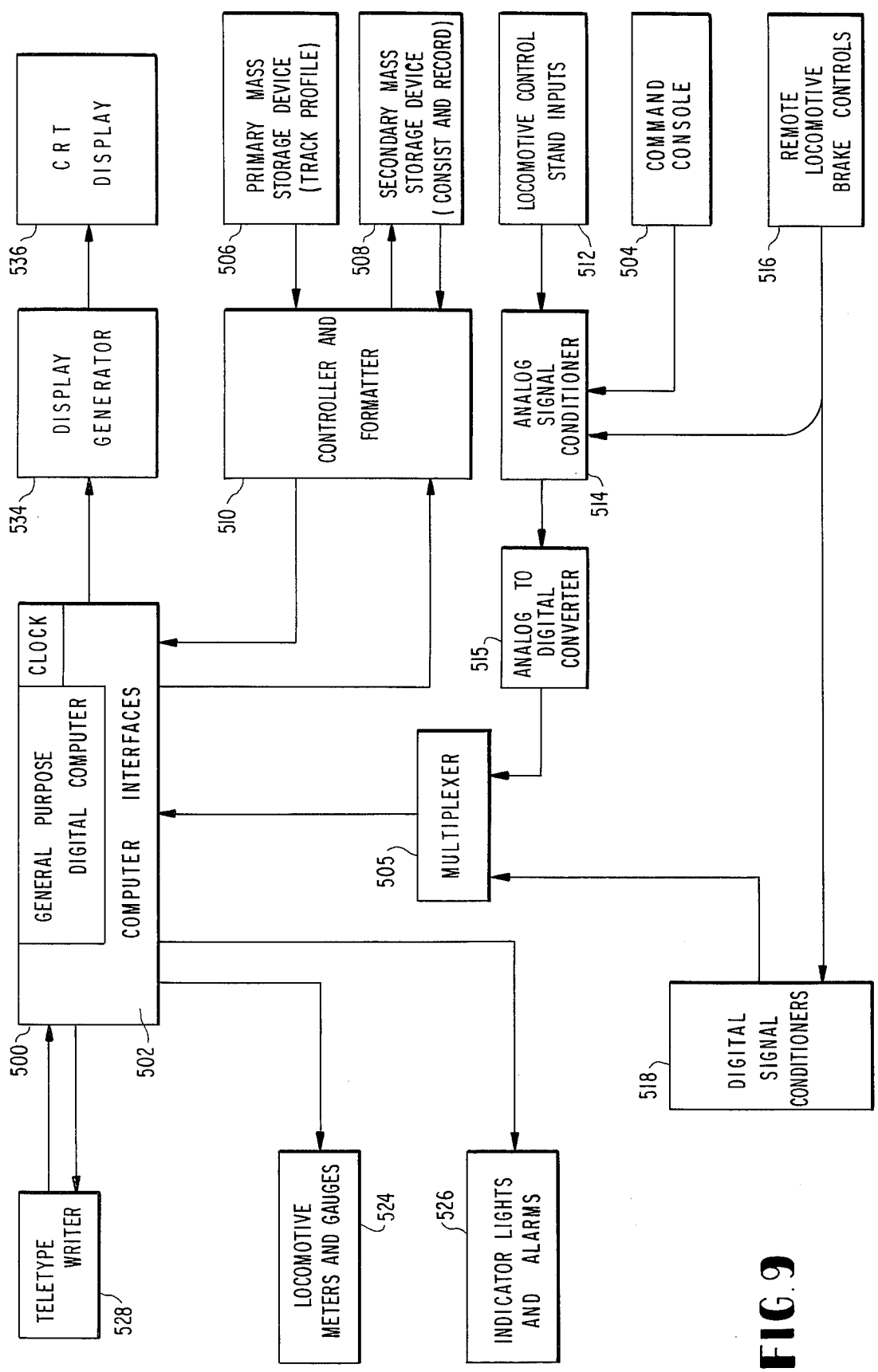
Figures 10, 11:
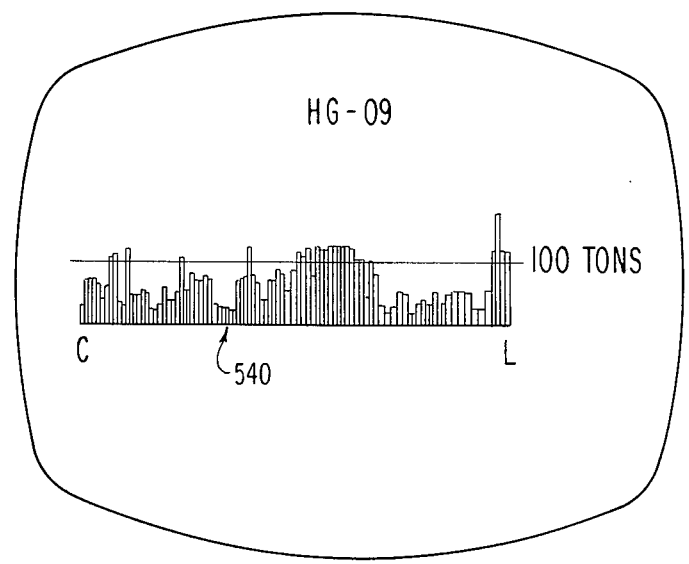

FIG. 7 is an illustrative plan view of a typical display according to a preferred embodiment of the subject invention wherein various indicia are depicted including a track grade profile and mile post indicators superimposed upon the track grade profile, a depiction of a train proceeding along the track grade profile, a track curve profile coextensive with the track grade profile, a calculated coupler force distribution between each of the plurality or articulated cars of the train, town locations upon the track grade profile, speed limit zones upon the track grade profile, and a brake pressure distribution;

FIG. 8 depicts a train mathematical model utilized in the simulator of the present invention indicating coupler forces and resistance forces of individual cars of the train;

FIG. 9 is a block diagram of the basic components of the simulator;

FIGS. 10 and 11 illustrate alternative bar graph and alphanumeric displays which depict the car consist of the simulated train on the cathode ray display unit;

FIGS. 12A–12E comprise logic flow charts of a preferred embodiment of the invention for dynamically computing coupling forces between each car throughout the extent of the train and displaying the computed coupling forces and brake pressure distribution upon the cathode ray tube display of the simulator; and FIGS. 13–18 contain illustrative cathode ray tube displays for various track profiles and simulated operating conditions.

DETAILED DESCRIPTION

Context of the Invention

Before discussing in detail the preferred embodiment of the subject invention, a brief background exposition of train action phenomena may be useful.

In this connection, FIGS. 1 and 2 disclose plan and side elevational views, respectively, of a train 100 operably positioned upon an underlying roadbed and railway track 102. The horizontal profile discloses a general curvature or bend in the roadway. The track grade is depicted in FIG. 2 and comprises a slight depression or valley wherein a zone of maximum turning 104 in FIG. 1 generally coincides with a lowermost portion 106 of the grade profile.

The train is composed of first and second diesel electric locomotives 108 and 110 coupled in tandem into an operative pair or set for pulling a string of articulated railway cars in the general direction of arrow 112. In some instances mid-train locomotive units (not shown) may advantageously be utilized, however, for ease of illustration, only forward or lead units are shown herein. The car consist of a typical train as depicted in FIGS. 1 and 2 includes randomly positioned cars of widely varying size, weight (both loaded and empty), and function. More specifically, the train consist may include gondola cars 114, 116 and 118, box cars 120 and 122, tank cars 124 and 126, a piggyback flat car 128, general purpose flat cars 130, 132, 134, 136 and 138, and hopper cars 140 and 142. It will be appreciated that the foregoing illustrative consist is entirely random and the lengths, weights, and cross-sectional area, and in some instances the number of axles, may vary from car to car.

The cars are interconnected with conventional coupling units 144 so as to produce an articulated train coupled behind the pulling locomotives 108 and 110.

The coupling units 144 are typically connected to the car underframe sill structure through draft mechanisms. While friction and rubber draft gears having operative strokes of 2 to 4 inches are widely utilized application of hydraulic cushioning units of the type previously noted is wide spread throughout the industry. These hydraulic cushioning units typically vary in stroke from 7 to 15 inches for each coupler shank. Thus, in a composite coupling junction, hydraulic draft units may provide 30 inches of cushioned travel from complete "run-out" to complete "run-in". Still further dimensional clearances within the coupling structures provide a few inches of play at each coupling junction.

Accordingly, and as illustrated particularly in FIGS. 1 and 2, when cars of the train are ascending a grade such as the first five cars of the train 100, the couplers of ascending cars are typically placed in tension and the spacing between cars may be "run-out" or the draft gears will be fully extended, as illustrated by spacing lines 150, 152, 154, 156 and 158. As cars are descending a grade, however, there will be a tendency for the cars to close relative to one another and the cars will be "run-in" or the draft gears will be fully closed, as shown at 162, 164, 166, 168, 170, 172, 174, 176.

A transition zone exists where the cars may not be completely run-in or run-out. Such intermediate spacing is illustrated at 178 in FIG. 1 wherein the hydraulic cushioning units are capable of movement in either direction.

Run-in phenomena as previously noted are extremely undesirable train action events which may generate high compressive forces, components of which may be sufficient to lift or tend to lift a car at the lowermost portion of the track and thus present a potential derailment situation. This difficulty is greatly accentuated when a curve is encountered at a low portion of the track profile. In this connection, a component of the compressive force will tend to push the cars in zone 104 such that the wheel flanges will ride over the rails and derail the train. Furthermore, once a car is completely run-in, it in essence becomes a solid mass with the next adjacent car. Accordingly, if ten or twenty cars are run-in, the coupler force of a solid mass of steel ten or twenty cars long is input to the lead coupling. As a consequence of these blocks of cars acting as a single moving mass still higher forces can be developed greatly increasing the probability that a derailment might occur.

Referring now specifically to FIG. 3, a different type of undesirable train action is illustrated. In this connection, the entire train 100 is run-out with maximum spacing 180, 182, 184, 186, 188, 190, 192, 194, 196, 198, 200, 202 and 204 at each coupling unit. With the entire train stretched and the locomotive proceeding on a downgrade, pulling force by the locomotive may generate tremendous tensile loads at the apex zone 206 of the track profile. Accordingly, as cars pass over this zone, there is a distinct possibility of a train parting because of a broken knuckle in the coupler, sheared coupler pin or the like.

Train partings, while not as disastrous as derailments, are highly unacceptable to economic railroad management. In this connection, the front portion of the train must be backed up in order to repair the coupling and reestablish a connection. This work may tie up a track for extended periods. Since most lines are still multidirectional on one track, traffic will be tied up in both directions while the repairs are made, thus, necessitating rescheduling, etc.

From the foregoing, it will be appreciated that it would be highly desirable to be able to simulate car coupling forces and thus provide an informational base to analyze the coupling forces in various operating circumstances and thereby minimize potential derailment and parting situations.

System Components

Figure 4:
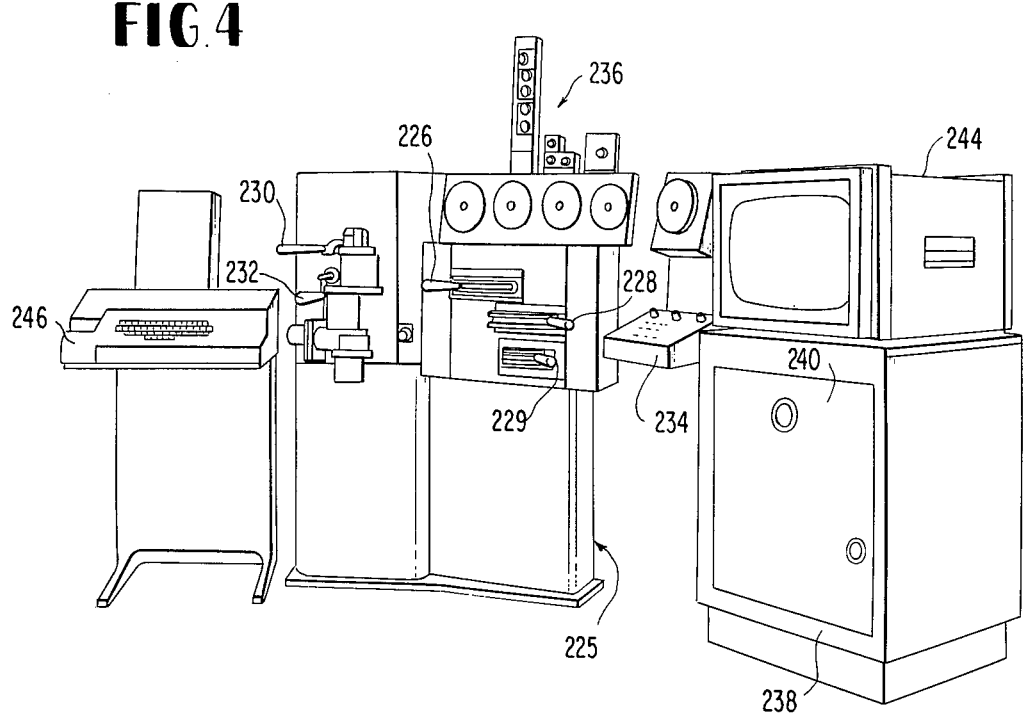
FIG. 4 is a front perspective view of a simulator constructed in accordance with the present invention showing a cathode ray display unit, a control stand including throttle braking controls, a keyboard command console, and a printout unit.
Figure 5:
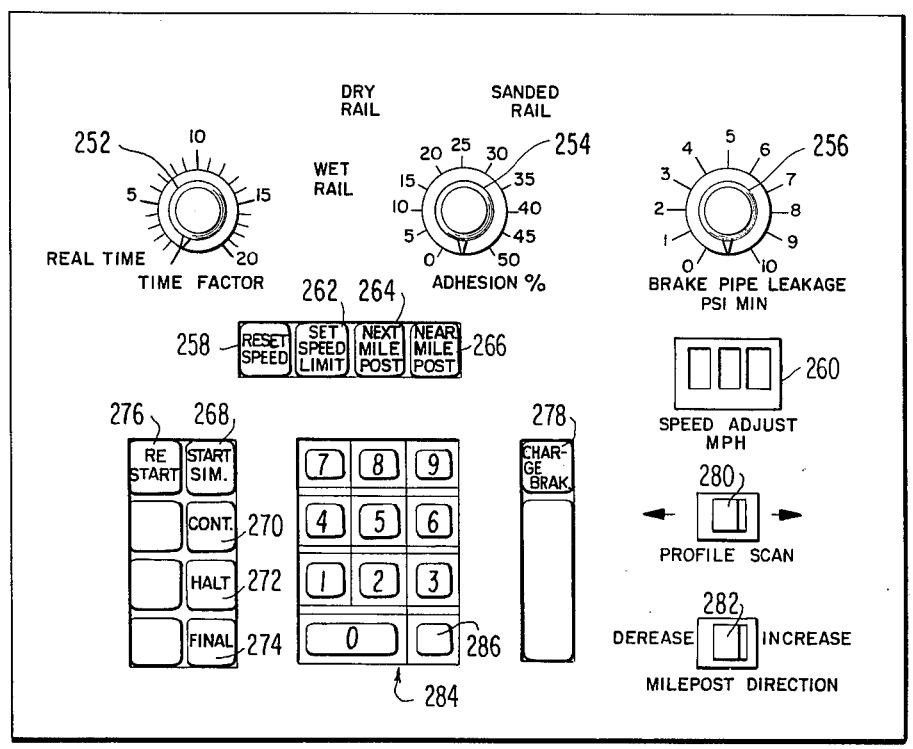
FIG. 5 is an enlarged view of the controls of the command console.

Referring now particularly to FIGS. 4, 5 and 6 of the drawings, there will be seen views of a simulator control station and its basic components.

As shown in FIG. 4, the simulator control station comprises a control stand, generally 225, which approximates an actual locomotive control unit, e.g., the control unit disclosed in applicant's co-pending U.S. application Ser. No. 599,043. An engineman's chair (not shown) may be located adjacent to control stand 225. The control stand 225 includes a conventional eight notch dynamic brake control 226, an eight notch power throttle 228, a sanding wobble stick 229, a train line air brake valve 230 and an independent locomotive air brake valve 232. Control stand 225 also includes a plurality of conventional gauges and meters to provide visual information on various train parameters.

Positioned adjacent to control stand 225 is a keyboard command console 234. In addition, a remote locomotive control unit 236 is mounted atop the control stand. Both keyboard command console 234 and remote locomotive control unit 236 are explained in more detail below. Enclosed within a suitable housing are a general purpose digital computer at 238 and a magnetic tape storage device at 240. The magnetic tape storage device includes a first tape transport used for storage of track profile information and a second tape transport used for storage of locomotive performance characteristic and train consists. Further, a cathode ray tube display module 244 is mounted on top of the computer and tape storage housing.

A printout unit 246, e.g., a conventional teletypewriter machine, is provided to allow the operator to obtain printout information in addition to the display on the cathode ray tube. The unit 246 is also used to prepare consists and to read in consists from previously prepared paper tapes.

The operative interrelationships of the control stand, the keyboard command console, the computer, the magnetic tape storage device and the display module will be more fully discussed hereinafter with reference to block diagrams and logic flow charts of FIGS. 9 and 11. Briefly, however, these components function to dynamically display train parameters such as vertical and horizontal track profiles, train presence relative to the profiles, coupling forces and brake cylinder pressures throughout the train to a control station operator to simulate movement of the train along a predetermined route of travel.

Keyboard Command Console

Referring to FIG. 5, the keyboard command console, generally 234, includes a plurality of controls to enable the operator to set up the simulator for operation and to manipulate the conditions being simulated. A time factor control 252 allows the operator to adjust the time factor of the simulator from real time, where one second of real time equals one second of simulated time, to twenty times real time, where one second of real time equals 20 seconds of simulated time, to simulate a run more quickly. An adhesion control 254 allows the operator to adjust the wheel to rail adhesion factor at zero speed to simulate various rail conditions, e.g., wet, dry, slick, etc. In addition, a brake pipe leakage control 256 allows the operator to set a brake pipe leakage rate from zero to 10 psi/min. The brake pipe leakage is assumed to be uniform throughout the train.

The keyboard includes a reset speed key 258 which immediately adjusts train speed to the speed shown on a speed adjust meter 260. This control allows the train speed to be initialized to permit an investigation of train behavior at any desired speed. A set speed limit key 262 sets a maximum speed limit to the amount shown on a speed adjust meter 260. If the simulated train exceeds the speed limit, a speed alarm (not shown) is actuated.

The keyboard also includes a next mile post key 264 to move the head of the simulated train immediately forward to the next mile post on the display. In addition, a nearest mile post key 266 is provided to move the head of the simulated train either forward or backward to the nearest mile post on the display.

The speed adjust meter 260 allows the operator to select either a desired speed of the train, when used with the reset speed key 258, or a speed limit when the set speed limit key 262 is used. Upon restart or start-up of the simulator, the train speed is initialized to zero.

A start simulation key 268 allows the operator to begin a simulated run with a preloaded or previously loaded consist. It also allows the operator to select a new profile and/or mile post during a simulation. A continue key 270 is provided to allow a simulation to continue after actuation of a halt key 272 to stop the simulation. When the halt key 272 is actuated, the existing display on the cathode ray tube is maintained until the continue key 270 is actuated.

A final or summary key 274 is provided to allow a summary of events for the simulated run to be displayed on the cathode ray tube. The summary may include departure and arrival times with trip total and total stops, information on fuel consumption and brake usage, total trip mileage, average speed and maximum speed. This key may be depressed at any time during the run. Upon subsequent actuation of continue key 270, the simulated run will resume at the point where key 274 was depressed. The summary of events is cumulative and is reinitialized only after restarting the simulation. A restart key 276 allows the operator to restart the simulation. Upon actuation of this key, the summary of events is reinitialized.

The keyboard further includes a charge brake pipe key 278 to achieve instantaneous charging of the brake pipe, auxiliary reservoirs, and emergency reservoirs in accordance with the feed valve setting. Actuation of this key also resets all brake cylinder pressures at zero. This control is provided to save time for simulations. When the simulator is started up or restarted, the train consist is initialized with the air brake system in a completely dry, i.e., depleted, state.

A profile scan switch 280 allows the operator to scan the profile on which the simulation is to be run. Upon movement of switch 280 leftward, train movement to the left is simulated by movement of the profile to the right under the simulated train. Similarly, upon movement of the switch rightward, the profile moves to the left under the train. The scan speed can be increased by adjusting time factor control 252 to increase the time factor. Scanning the profile does not affect the distance totals displayed in the summary of events.

A mile post direction switch 282 is provided to control the heading of the train. The switch can be set to the right to allow simulated movement of the train along an increasing sequence of mile posts or to the left to simulate movement of the train along a decreasing sequence of mile posts.

Finally, the keyboard includes a set of numeric keys 284 which is used for option selection during set-up of the simulator and for mile post entry during simulation. A decimal key 286 is used to alternate between a bar graph display (FIG. 10) and an alphanumeric consist description during the set-up sequence and to recall the bar chart and consist description frames during a simulated run.

It will be appreciated that the various controls on the keyboard command console 234 may be conventional potentiometers and switches which provide appropriate signals simulating the conditions and/or controls desired. For example, the controls 252, 254 and 256 may be potentiometers providing analog signals related in value to the positions of the control knobs on the console. These analog signals may be converted to digital form for use in the simulation system as will be described hereinafter in greater detail. Similarly, the switches and push buttons on the console 234 may provide suitable digital signals (e.g., binary ONE and ZERO levels) depending upon the positions thereof. The keyboard 284 may be a conventional binary, octal or BDC keyboard providing, for example, binary coded decimal (BCD) signals indicative of the keys depressed by the operator. Conventional thumbwheel switches with BCD encoded output signals may be utilized for the speed adjust control 260 and, as with the other digital and analog signals produced by the console 234, the signals are used to produce the simulation as shown hereinafter.

Remote Locomotive Control Unit

Referring to FIG. 6, the remote locomotive control unit 236 includes a selector 288 to allow the operator to select the throttle position for any remote locomotives in the simulated train. The selector includes throttle positions 1-8 along with idle, isolate, and MU positions. A mode selector switch 289 is provided to allow the operator to simulate either power or dynamic brake conditions at the remote locomotives. In addition, the remote locomotive control unit includes a feed valve in/out switch 290 to control the brake pipe pressure and a sanding on/off switch 291 to control simulated sanding of the rails.

The remote locomotive control unit also includes an air brake pushbutton console, generally 292, including an emergency stop button 293, a two-button automatic brake control having an application button 294 and a release button 295, and a two-button control for the independent locomotive brakes having an application button 296 and a release button 297. The various push buttons and switches conventionally provide signals for use by the simulation system as described above and as will be seen hereinafter.

Electronic Display Screen

Referring to FIG. 7, there is shown the screen of an electronic display device 300 of display module 244 in accordance with a preferred embodiment of the invention. The electronic display device 300 is of a conventional design and may be, for example, a cathode ray tube (CRT) which may be scanned in any suitable conventional manner such as through the use of a raster scanning and intensity modulating technique or by oscilloscope type scanning techniques.

An initial track profile or grade line trace 302 is projected upon the screen and represents vertical grades of an undulating track along a predetermined route of travel. The grade profile 302 is intercepted at regular intervals by vertical traces 304 headed by sequential numeric representations 354-357 indicating mileposts along the predetermined route of travel. A train display 306 is projected upon the cathode ray screen in a posture overlying the track profile and represents the length and position or presence of the train with respect to the track profile. A vertical trace 308 represents the head of the train, while a vertical trace 309 represents the caboose. Additional information such as town locations 310, speed limit zones (not shown), etc. may be superimposed upon the track profile 302.

In addition to the foregoing vertical track profile, horizontal curve profile information is depicted by a trace 312 wherein curves are indicated as vertical deviations, e.g., square pulses 314, 315, 316 and 317 from a horizontal reference line. The duration of each pulse represents the length of the curve, while the direction and height of each pulse represents the curve direction and degree of curvature, respectively. A pulse above the reference line represents a curve to the right and a pulse below the reference line represents a curve to the left.

Underlying the train profile 306 is a car coupler force profile 318. A zero force ordinate 320 is projected coextensive with the coupler force profile. As illustrated in FIG. 7, therefore, the coupler forces between adjacent cars throughout the front portion of the train, i.e., rightward of a crossover point 321, are positive values and this portion of the train is stretched. The coupler forces between adjacent cars in the rear portion of the train, i.e., leftward of crossover point 321, are negative values and this portion of the train is compressed. The initial value as at 322 represents the coupling force between the locomotive and the next adjacent car while the final value at 324 represents the force of the last car which must necessarily be zero. The car coupler force display includes an upper horizontal line 325 representing 250,000 pounds tension and a lower horizontal line 326 representing 250,000 pounds compression. A series of indicators adjacent to vertical trace 308 is spaced at 50,000 pound increments.

In addition, a brake cylinder pressure trace 328 is displayed on the screen below the car coupler force profile to indicate the braking pressures applied throughout the length of the train in response to actuation of train line air brake valve 230 and locomotive air brake valve 232. Horizontal trace 326 represents 50 psi brake pressure, while a plurality of indicators adjacent to vertical trace 309 represent 10 psi increments. A short horizontal mark 329 adjacent to vertical trace 309 is displayed to indicate the brake pipe pressure at the caboose. Brake cylinder pressure trace 328 indicates that the automatic brakes are being released with a constant brake pressure in the rear portion of the train and a brake pressure which gradually decreases toward the front of the train.

Additionally, train operational information is alphanumerically displayed upon the screen 300. In this connection, operational information such as calculated average train acceleration 332 after a certain distance is traversed with a particular throttle setting and track profile may be displayed to the control station operator. If desired, current train speed (not shown) may also be displayed. A simulated digital time display 334 may be included. Further information 336, such as throttle notch setting at the head of the train, slave locomotive throttle notch setting, etc. may be displayed to the control station operator.

The foregoing indicia depicted in FIG. 7 are not meant to be exhaustive and one skilled in the art will be able to further supplement this visual display to the control station operator in order to simulate operation of the train and to train operators in the control of the train over various routes of travel.

Mathematical Model

In accordance with a preferred embodiment of the subject invention, it has been determined that a car coupler force distribution profile may be mathematically calculated throughout a train with a sufficient accuracy to be of substantial utility in anticipating and thus minimizing train action events. The force distribution may thus be calculated from simulated data as a training tool.

In order to fully appreciate the development of mathematical approximations for coupling force between each car, a model may be useful, such as illustrated in FIG. 8, wherein a lead locomotive set 400 is coupled to an articulated string of cars 402. The cars may be referenced in sequential numeric order taking the caboose 404 as car 1 and proceeding toward the locomotive set 400.

The caboose 404 is not coupled to a further car thus the coupling force at the end of the caboose $F_o$ is equal to zero. The coupling force at the lead end of the caboose or first car is equal to a summation of the resistance forces of the caboose to forward motion. These forces may be approximated by a rolling resistance factor $R_R$, a braking resistance factor $R_B$ and an acceleration resistance $R_A$.

Rolling resistance $R_R$ includes such factors as (a) rolling friction between wheel and rail; (b) axle bearing friction; (c) flange friction which varies with speed; (d) air resistance; (e) track grade resistance and (f) track curvature resistance.

Braking resistance $R_B$ is a factor applicable when individual brake shoes mounted upon each car are applied. Under many running conditions, the individual car brake shoes will not be applied and this factor will accordingly be zero.

Acceleration resistance $R_A$ is a factor which is required to produce accelerated translation of the car and accelerated rotation of the car wheels about their axle centers.

In equation form such forces for the caboose or first car may be represented as follows:

$$F_{RBA1} = R_{R1} + R_{B1} + R_{A1}.$$

In a similar vein the coupling force at the lead end of the second car 406 is equal to a summation of the resistance forces of the caboose and the resistance forces of the second car to forward motion. In equation form such forces may be represented as follows:

$$F_{RBA2} = (R_{R1} + R_{B1} + R_{A1}) + (R_{R2} + R_{B2} + R_{A2})$$
$$= (R_{R1} + R_{R2}) + (R_{B1} + R_{B2}) + (R_{A1} + R_{A2}).$$

Generalizing for an $n^{th}$ car the equation becomes:

$$F_{RBAn} = \sum_{i=1}^{n} R_{Ri} + \sum_{i=1}^{n} R_{Bi} + \sum_{i=1}^{n} R_{Ai}. \tag{1}$$

A numeric factor for rolling resistance $F_R$ for an $n^{th}$ car may be calculated from a modified Davis train resistance formula as follows:

$$R_{Rn} = (1.3 + \frac{29}{W_n} + C_{vn} V + \frac{C_{Dn} A_n V^2}{W_n N_n}) W_n N_n \tag{2}$$
$$+ 20 G_n W_n N_n + 0.8 C_n W_n N_n$$

wherein:
$R_{Rn}$ = rolling resistance of the $n^{th}$ car, pounds;
$W_n$ = average weight per axle of the $n^{th}$ car, tons;
$C_{Vn}$ = coefficient of rolling resistance of the $n^{th}$ car, typically 0.030 to 0.045;
$V$ = speed, assumed to be the same throughout the length of the train, mph;
$C_{Dn}$ = wind resistance drag coefficient of the $n$th car, typically 0.0003 to 0.003;
$A_n$ = cross-sectional area of the front of the $n^{th}$ car, sq. ft.;
$N_n$ = total number of axles of the $n^{th}$ car; and $G_n$ = ascent or descent in feet-in-one-hundred or percent grade beneath the $n^{th}$ car; and $C_n$ = track curvature in degrees beneath the $n^{th}$ car.

Using such parameters as the length of each car together with the location of the train on the track, the grade and curvature for the track under each car can be determined from recorded track profile data over a predetermined route of travel.

The braking resistance factor $R_B$ may be estimated for those circumstances when the train brakes are in application. The braking force on the $n^{th}$ car may be numerically determined by:

$$R_{Bn} = P_{cn}(A_c Le)_n f_n \qquad (3)$$

wherein:

$R_{Bn}$ = train braking resistance of the $n^{th}$ car, pounds;

$P_{cn}$ = brake cylinder pressure of the $n^{th}$ car, psi;

$A_c$ = brake cylinder piston area of the $n^{th}$ car, sq. in.;

L = brake lever mechanical advantage of the $n^{th}$ car;

e = brake rigging efficiency of the $n^{th}$ car; and f = brake shoe to wheel coefficient of friction of the $n^{th}$ car.

It should be noted that the factors $A_c$, L and e can be pre-specified as an average parameter for each car. The coefficient of friction is a function of car speed, type of brake shoe and wheel temperature. The coefficient of friction can be determined using empirical relationships available from manufacturers of car broke equiment.

The brake cylinder pressure $P_{cn}$ is a function of the relatively recent history of the train line air pressure which, in actual train operations, is measured at the lead locomotive and used as required to predict the state of application of the train brakes. Empirical relationships describing the buildup of pressure at each brake cylinder have also been established by manufacturers of car brake equipment.

In determining the acceleration resistance an assumption is made that the entire train accelerates equally. With this initial assumption, the pulling force for the entire train between the locomotive set 400 and the next adjacent car less the total rolling and train braking resistance of the train is equal to the total effective mass of the train times the acceleration. In equation form this relationship may be indicated as follows:

$$F_{loco} - (\sum_{i=1}^{total} R_{Ri} + \sum_{i=1}^{total} R_{Bi}) = (\sum_{i=1}^{total} M_{ei})a \text{ or}$$

$$a = \frac{(F_{loco} - (\sum_{i=1}^{total} R_{Ri} + \sum_{i=1}^{total} R_{Bi}))}{\sum_{i=1}^{total} M_{ei}}$$

A numeric acceleration term $R_A$ for an $n^{th}$ car may be determined as follows:

$$R_{An} = a(M_{en} \text{ effective}) \qquad (4)$$

$$= \frac{(F_{loco} - (\sum_{i=1}^{total} R_{Ri} + \sum_{i=1}^{total} R_{Bi}))}{\sum_{i=1}^{total} M_{ei}} M_{en}$$

wherein:

$F_{loco}$ = coupling force between the locomotive and the adjacent car of the train;

$R_R$ = the rolling resistance of each car as determined by equation (2);

$R_B$ = the train braking resistance of each car as determined by equation (3);

$W_n$ = average weight per axle of the $n^{th}$ car;

$N_n$ = total number of axles of the $n^{th}$ car; and $M_{en}$ = the effective mass of the $n^{th}$ car which includes a factor for translation acceleration and a factor for wheel rotation acceleration;

$$= 91.05 W_n N_n + 36.36 N_n.$$

From the foregoing the coupling force between each car $F_{RBAn}$ may be computed from equation (1). While the foregoing equations have been developed on the basis of lead locomotives only, those skilled in the art will be able to alter these equations to account for one or more mid-train locomotive units.

System Description

One preferred system for simulating the operation of and control of a train is illustrated in FIG. 9. More specifically, a general purpose digital computer 500 (shown at 238 in FIG. 4) is coupled through conventional computer interfaces 502 with various data input and output devices described hereinafter.

A command console 504 (shown at 234 in FIG. 5), which includes an input keyboard and various control switches explained above, provides communication between the control station operator and the digital computer 500 through a suitable conventional selective signal scanning device, such as a multiplexer 505, and computer interfaces 502.

In addition to the data storage capacity provided by the computer 500, primary and secondary mass storage devices 506 and 508 corresponding to the first and second tape transports of magnetic tape storage device 240 (shown in FIG. 4) may communicate with the digital computer 500 through a conventional controller and formatter 510 and the computer interfaces 502. The mass storage devices 506 and 508 may be, for example, magnetic or paper tape storage units and may be used to store track profile and consist data obtained prior to a simulated run and to record and store, for subsequent evaluation, selected operational data of the train along a predetermined route of travel.

The controller and formatter 510 functions in a well known manner to control the transfer of data between the computer 500 and the storage devices 506 and 508 in response to commands from the computer 500. The controller and formatter 510 also insures proper formatting of the data transferred from the computer 500 and the storage devices 506 and 508. The controller and formatter 510 may be any suitable conventional device capable of performing functions in conjunction with the particular computer and the storage devices being employed. Such units are typically available from either the computer manufacturer and/or the supplier of the storage devices.

The system includes locomotive control stand inputs 512 which provide analog control signals in response to the various manual controls of control stand 225, e.g., dynamic brake control 226, power throttle 228, automatic brake handle 230, independent braking handle 232, the brake pipe feed valve and remote locomotive throttle selector 288. The analog signals produced by locomotive control stand inputs 512 are applied via an analog signal conditioner 544 and an analog to digital converter 515 to multiplexer 505. In addition, the system includes remote locomotive brake controls 516 (shown at 292 in FIG. 6) which is connected directly to multiplexer 505. The remote locomotive brake controls produce digital signals in response to actuation of air brake push-button console 292.

In the embodiment of the invention illustrated in FIG. 9, a signal related to the simulated locomotive consist pulling or braking force exerted upon the cars of the train is produced by the computer in response to actuation of dynamic brake control 226 or train speed control throttle 228. It is fed into analog signal conditioner 514 for amplifying and filtering. The amplified and filtered output signal from the analog signal conditioner 514 is then applied to analog to digital converter 515 for application to multiplexer 505. Similarly, a signal representing the train line air pressure, used in determining car braking resistance ($R_B$), is generated in response to the position of air brake system controls and supplied through analog signal conditioner 514 and analog to digital converter 515 to the multiplexer 516.

Further, a signal representing locomotive independent air brake pressure is generated in response to actuation of locomotive air brake valve 232 and supplied to the multiplexer 516 through analog signal conditioner 514 and analog to digital converter 515.

The multiplexer 505 may be controlled in any suitable conventional manner by the computer 500 to supply the conditioned output signals from dynamic brake control 226, train speed control throttle 228, train line air brake valve 230, locomotive air brake valve 232 and the feed valve to the digital computer 500 as required during the operations performed by the computer. For example, each of the signals may be continuously supplied to the multiplexer 505. When a particular signal is required in a computation, the computer 500 may address the appropriate input signal and gate that signal through the multiplexer. Since the force and pressure related signals are analog signals in the illustrated embodiment, analog to digital converter 515 is provided to convert the analog signals to a digital format compatible with the digital computer 500. If necessary, a signal representing the pulling or coupling force of a remote locomotive set is generated, in response to actuation of remote locomotive throttle selector 288, and applied to the multiplexer via analog signal conditioner 514 and analog to digital converter 515.

In a preferred embodiment of the invention, the distribution of car coupler forces in the train is preferably displayed through an electronic scanning technique. Accordingly, data defining the information to be displayed is applied through a conventional dislay generator 520 to an electronic display 522 such as a cathode ray tube (CRT) as previously mentioned in connection with FIGS. 4 and 7.

The display 522 may be an oscilloscope display wherein the vertical and horizontal positions of an electron beam are controlled to generate the display or alternatively a raster scan type of display wherein the intensity of a regularly scanned beam is controlled to generate the display. Assuming that an oscilloscope type of display is employed, the display controller 520 may be provided with X and Y coordinates of discrete points which together define the desired display. From these discrete points, the display controller may generate suitable horizontal and vertical deflection signals of an analog nature to deflect the electron beam of the display device along a path defining the desired display. Additionally, blanking signals may be generated to blank the beam at appropriate X and Y values along a scan line.

If a raster scan display device is utilized, the X, Y and Z intensity values of discrete points defining the desired display may be stored by the dislay controller and utilized to vary the intensity of the scanned electron beam in coordination with the vertical and horizontal scanning signals of the display device. For example, all of the stored points may be stored in order as to their X positions (i.e., the order of raster line on the display device), and for each raster line having more than one point thereon, may be ordered in accordance with the Y or horizontal value along that raster line. When the beam of the display device reaches a particular X, Y value corresponding to a point to be displayed the display controller may then modulate the intensity of the beam in accordance with the stored Z value of that point. Such display techniques are conventional and therefore will not be described in further detail.

Preferably, the system includes conventional locomotive meters and gauges 524, e.g., a speedometer, a caboose brake cylinder, a load current meter, a locomotive brake cylinder pressure gauge, an equalizer reservoir pressure gauge, and a brake pipe presssure gauge, which are operated by computer 500 via interfaces 502. The meters and gauges are mounted on the face of control stand 225 to provide information to the control station operator. The system also includes indicator lights and alarms 526, e.g., a wheel slip light, sanding light, brake warning light, power cutoff light, excessive force buzzer and an overspeed alarm, also operated by computer 500 via interfaces 502.

Teletypewriter unit 528 (shown at 246 in FIG. 4) is connected to computer 500 via interfaces 502 to permit the operator to obtain print-out information and to supply information to the computer via its keyboard or punched tape input.

The computer 500 of FIG. 9 may be any suitable conventional general purpose digital computer interfaced with external input/output devices in any suitable conventional manner and suitably programmed to perform the functions described herein. One example of a compact digital computer which is suitable for the subject system is a Naked Mini$^{T.M.}$16 produced by Computer Automation, Inc. of Irvine, California 92664. To facilitate an understanding of the operation of the computer 500 in conjunction with the input/output devices previously described in connection with FIG. 9, reference may be had to the flow diagrams of FIGS. 12A--12E.

System Operation

Figure 12A:
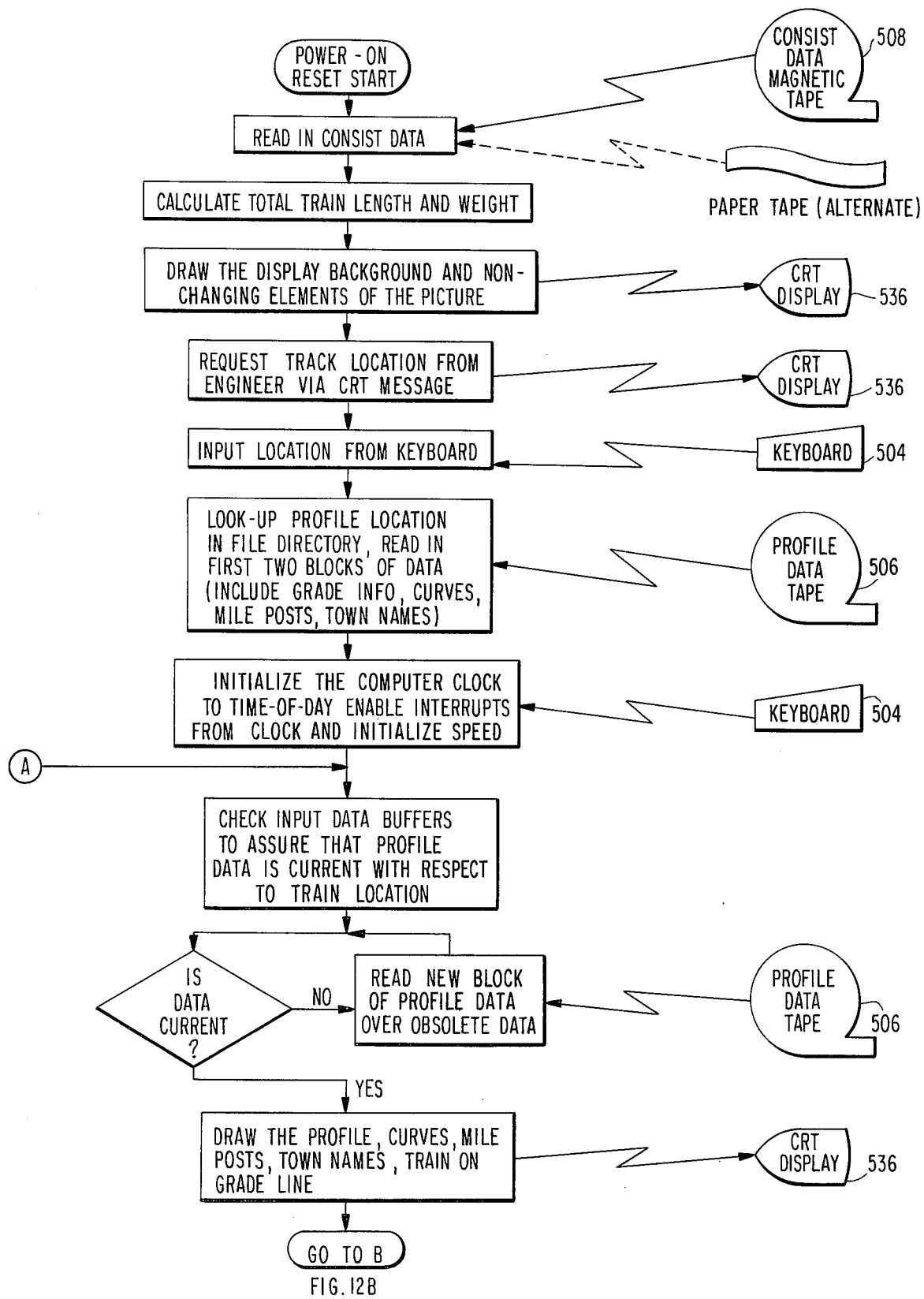

Referring now to FIG. 12A, consist data relating to the physical structure of the train (e.g., car type, lading weight, etc.) may be supplied to the computer from a suitable memory or data storage medium 508 such as a magnetic or paper tape. The car type data may be used by the computer as required to locate resistance coefficients and car parameters stored permanently in the computer in a table form. The consist data may then be initially used to calculate a total train length and weight.

The simulator can be operated by actuation of decimal key 286 (FIG. 5) of the command console to alternatively display a bar graph 540, shown in FIG. 10, and alphanumeric information shown in FIG. 11 on the train consist. In the bar graph display of FIG. 10, weight of each car is represented by the height of its corresponding bar. The designations "C" and "L" indicate the locations of the caboose and locomotives, respectively. As explained above, the consist information of FIGS. 10 and 11 may be displayed at any time during a simulated run.

The computer may now draw a display background and nonchanging elements of the output display on the cathode ray tube. The computer may then request track location from the control station operator by displaying a track location request on the cathode ray tube (CRT) display 536. The operator may then supply the desired track location of the train to the computer by way of the keyboard of command console 504.

With the train location established, data relating to the vertical and horizontal profile of the track at the established location may read from a profile data tape or other suitable memory 506. The operator may then initialize the computer clock to the current time of day through the use of the keyboard of command console 504 and train speed may be initialized either automatically or by way of the keyboard. The initialized speed quantity may thereafter be periodically updated as will be described hereinafter. The computer is then ready to perform the train coupler force analysis.

Input data buffers in the main computer memory may contain data from the external input devices and may be periodically checked to assure that the profile data is current with respect to the current train location. If the data is not current, a new block of profile data is read from the memory 506. When the profile data is current, the track profile, track curves, mile posts, town names and the train trace are drawn on the CRT display.

Figure 12B:
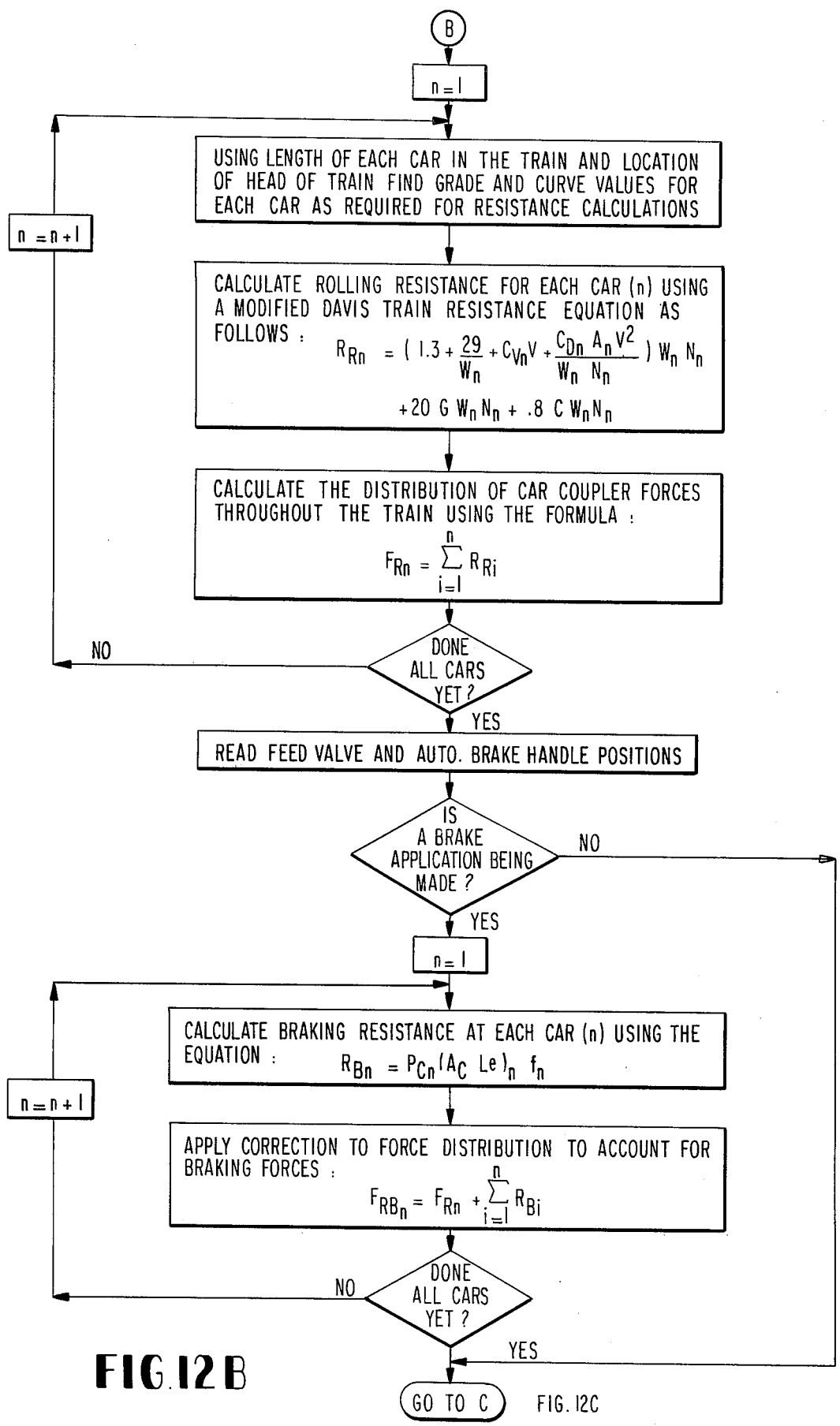

The distribution of car coupling forces throughout the train may next be calculated for each car (n) by first setting the value of n at 1 (first car) as is shown in FIG. 12B. Using the data as to the length of each car in the train and the location of the head of the train, the grade and curve values are determined for each car from the track profile data for use in resistance calculations. The rolling resistance calculations for a car $R_{Rn}$ may be performed from the car data, train velocity, grade and curve values by using a modified Davis train resistance equation as previously discussed in the Mathematical Model section, note equation (2). The calculation of each car rolling resistance value is repeated until the car coupler force values are available for all n cars. The computer then continues in accordance with FIG. 12B.

With continued reference to FIG. 12B, the positions of the feed valve and the brake handle of train line air brake valve 230 are requested by the computer, and if a car braking application is being made, the braking resistance $R_B$ for each car is calculated as set forth in the Mathematical Model section, note equation (3).

Rolling resistance forces $F_{Rn}$ are then corrected to account for these braking forces $F_{Bn}$ to provide a corrected coupler force $F_{RBn}$ at each car.

After the distribution of rolling resistance forces in the train have been computed and corrected for braking forces, the computer proceeds to determine an acceleration resistance factor $R_A$ by determining locomotive pulling force $F_{loco}$ as previously described in connection with FIG. 9.

Figure 12C:
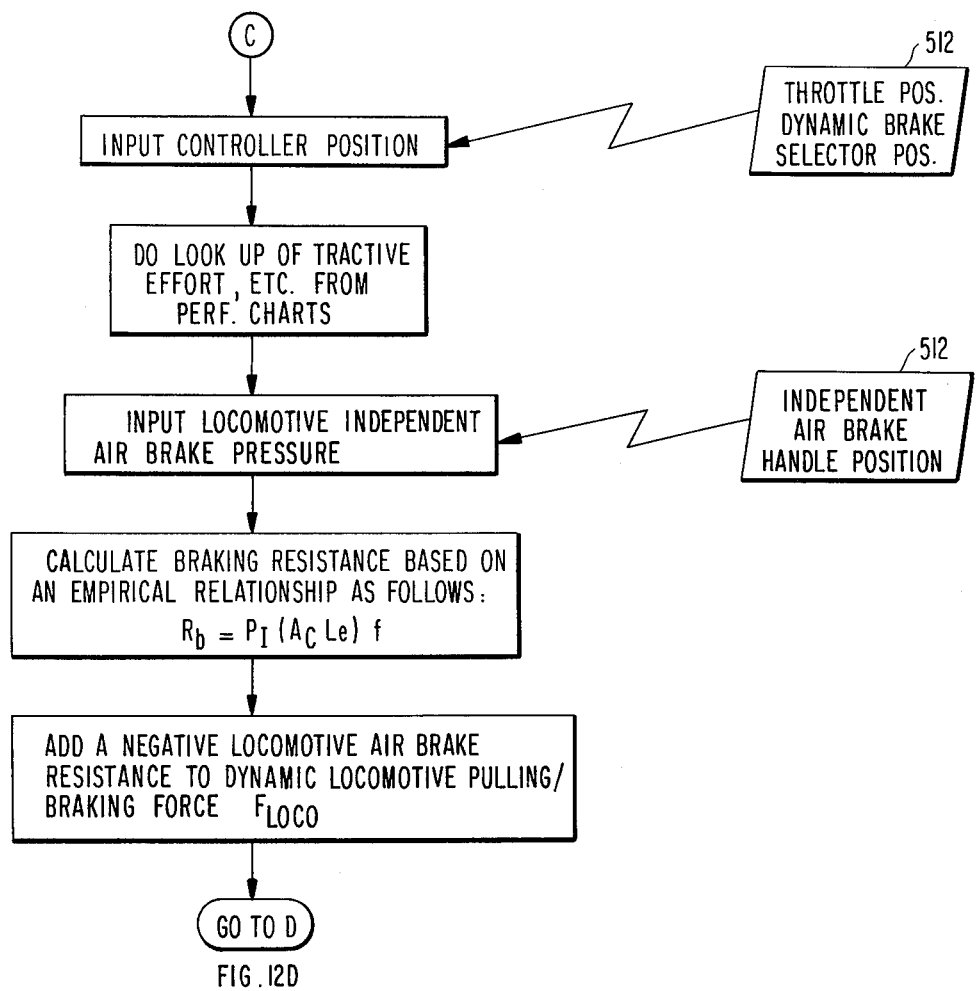

The method in which the locomotive pulling force $F_{loco}$ may be determined is illustrated in FIG. 12C. In this connection, a signal derived from the locomotive control stand inputs 512 and determined by the power throttle position and dynamic brake selector position may be provided to the computer as previously described in connection with FIG. 9. The pulling force $F_{loco}$ may be determined by reference to pre-recorded performance charts or tables which provide the locomotive tractive effort corresponding to the control stand inputs.

As a refinement or correction factor to $F_{loco}$, the computer may be supplied with information as to locomotive independent air brake pressure derived from the position of the independent air brake handle of control stand inputs 512 and with consist data. Locomotive braking resistance $R_b$ may then be calculated in accordance with the following equation:

$$R_b = P_I(A_c L e)f$$

wherein:

$P_I$ = locomotive independent air brake pressure;
$A_c$ = brake cylinder piston area of the $n^{th}$ car, sq. in.;
$L$ = brake lever mechanical advantage of the $n^{th}$ car;
$e$ = brake rigging efficiency of the $n^{th}$ car; and
$f$ = brake shoe to wheel coefficient of friction of the $n^{th}$ car.

It should be noted that the factors $A_c$, $L$ and $e$ can be lumped together and prespecified as a single coefficient for each locomotive. The coefficient of friction f as a function of speed would be determined from an empirical relationship according to the type of brake shoes on the locomotive.

A negative independent locomotive air braking resistance $R_b$ is then added to the uncorrected $F_{loco}$ to provide an actual locomotive pulling (or braking) force $F_{loco}$. The computer may then continue to the functions illustrated in FIGS. 12D-12E and calculate car acceleration resistance $R_{An}$ (note equation (4)).

Figure 12D:
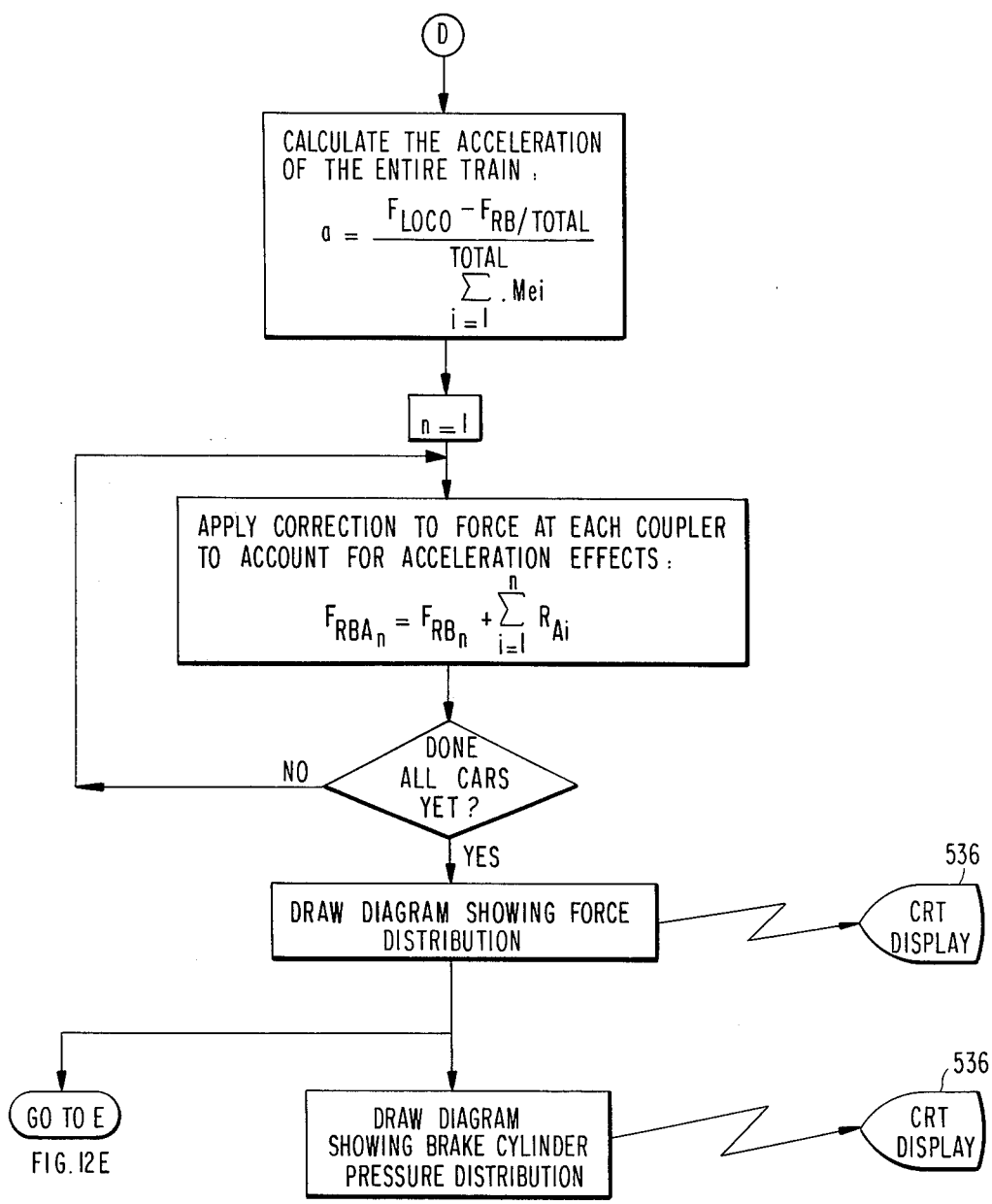

When locomotive pulling force has been calculated as described above, acceleration coupling forces between cars throughout the train may be calculated as shown in FIG. 12D in accordance with the equations as previously set forth in the Mathematical Model section, note equation (4).

Once the acceleration factor $R_A$ is calculated the total force upon each coupler may be calculated $F_{RBAn}$, note equation (1) in the Mathematical Model section. The computer 500 then sends this information through display controller 5334 to draw a coupler force distribution diagram 318, upon the CRT display 536, note FIG. 7.

Figure 12E:
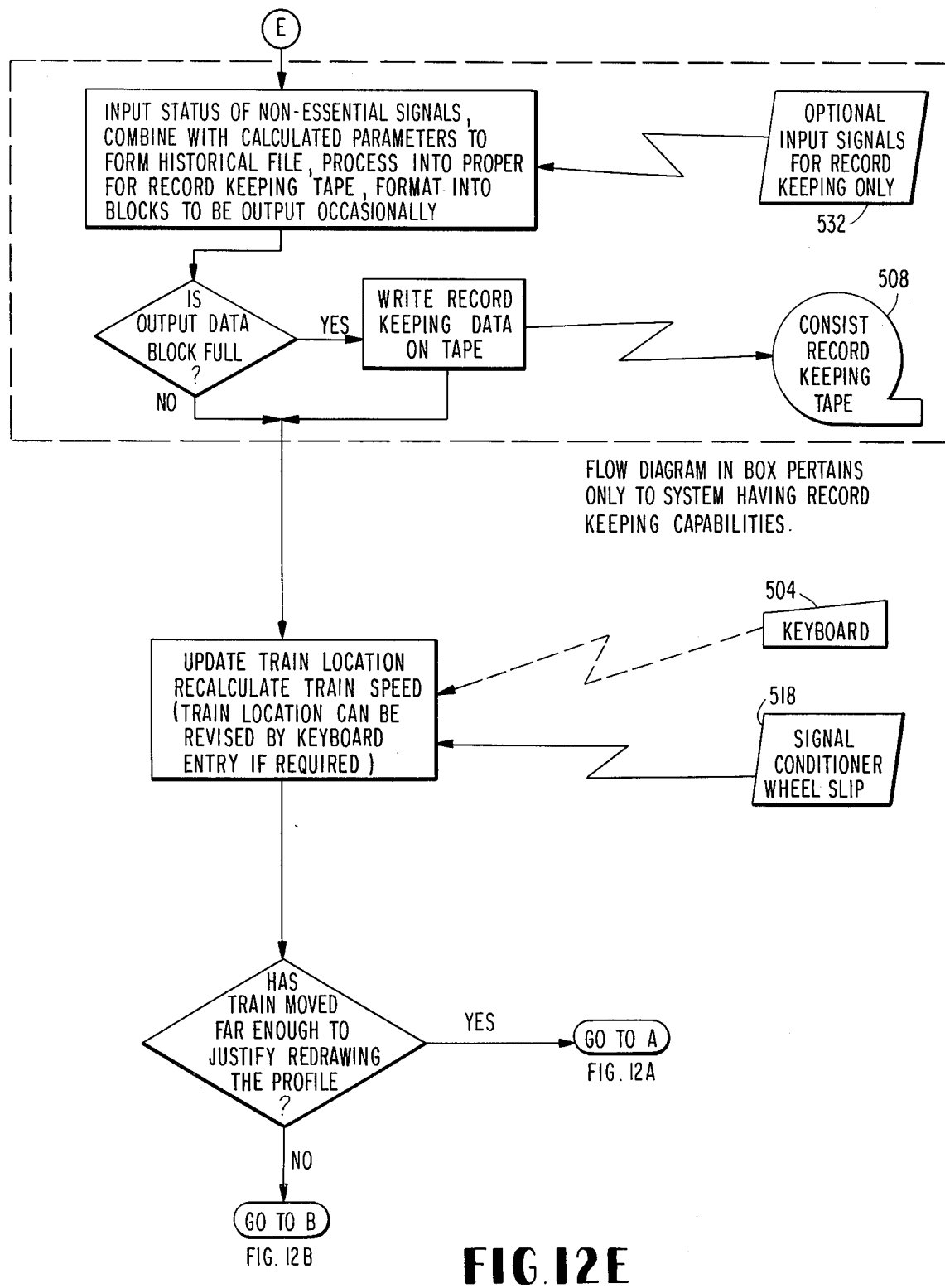

As illustrated in FIG. 12E, a record keeping routine may be provided in the computer to provide a record of the operation of the train. In addition, train location and train speed may be periodically updated and, when the train has moved far enough to justify redrawing of the profile, a new block of profile data may be read by cycling the routine back to point A in FIG. 12A. If the train has not moved far enough to justify the redrawing of the profile, a new cycle may be initiated by cycling back to point B of FIG. 12B.

In summary, the computer 500 operates in conjunction with the input/output devices as shown in FIGS. 9 and 12A-12E to dynamically provide a periodically updated display of the car coupler forces in the simulated train over the length of the train. Depending upon the speed of the computer, the period between successive updates of the force distribution may be extremely rapid so as to appear to be a continuous or an analog update. The coupler force distribution data is displayed against a background which includes a profile of the track as well as landmarks along the track. From the displayed information, the control station operator can observe excessive coupler forces in any one section of the simulated train and more evenly distribute forces by controlling the throttle setting or other appropriate action.

The foregoing discussion in connection with FIGS. 12A-12E provides a logic flow chart for dynamically calculating individual coupler forces throughout the extent of a train for simulated movement along a predetermined route of travel and dynamically displaying the forces to the operator.

Examples of Simulator Display

FIGS. 13-18 constitute examples of various simulator displays which may appear on display screen 300 in the operation of the simulator. Each example has the same general format previously explained in connection with display screen 300 illustrated in FIG. 7.

Figure 13:
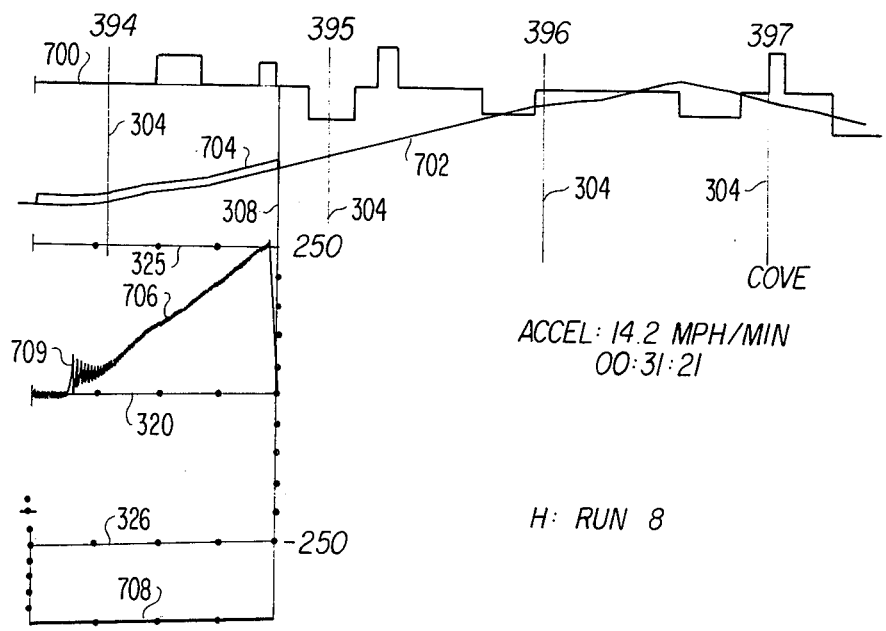

Referring to FIG. 13, vertical mile post indicators 304 bear a sequential caption 394-397 representing physical mile posts along a predetermined route of travel to be simulated. A first horizontal trace 700 represents the track curvature along the route defined by the mile posts. A second trace 702 extending across the display screen provides a visual representation of the track grade profile along the route of travel. The train is depicted by a trace 704 superimposed upon grade line 702. The town name "Cove" is displayed at mile post 397.

Trace 704 represents a train approximately one mile long with a locomotive set, e.g., three locomotives, moving toward mile post 395 with a caboose approaching mile post 394. The operative direction of travel of the train is from left to right in ascending order of mile post indicators. Functionally, train trace 704 remains stationary while grade line 702 and the mile post indicators are moved from right to left. Directly beneath train trace 704 is a coupler force distribution trace 706 which is initialized with respect to the head locomotive set by vertical trace 308. Immediately below the coupler force distribution trace is a brake pressure trace 708 which is also initialized with respect to the head locomotive set by vertical trace 308.

The example of FIG. 13 illustrates a simple run-out event. Calculated car coupler force trace 706 illustrates a pulling force behind the locomotives of about 250,000 pounds. As indicated by the display "H: RUN 8," the locomotive throttle is set in notch 8. The wheels on the third locomotive are probably slipping due to decreased adhesion on the curve at the head of the train. The grade at mile post 395 is about one percent. The display also includes a representation of average acceleration (14.2 mph/min) and simulated time (00:31:21).

The car coupler force trace illustrates that about one-eighth of the train at the rear is drifting forward because of the dip prior to mile post 394. The cars immediately ahead of the dip have just been run out as indicated by the transient force 709 having a peak value of approximately 85,000 pounds. The remainder of the train is completely in tension. The run-out will progress rearwardly until the entire train is stretched in tension on the ascending grade.

Figure 14:
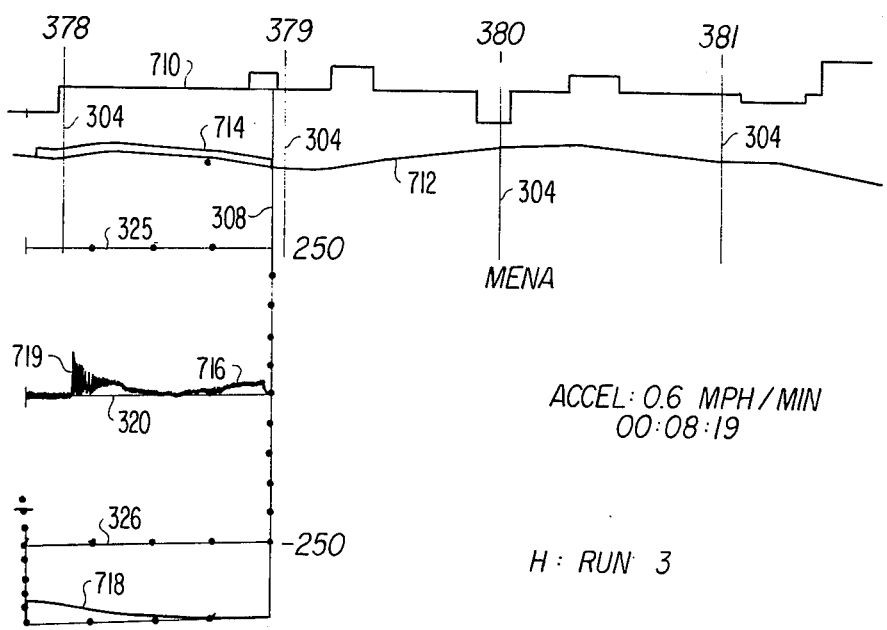

The display of FIG. 14 is an example of a run-out caused by a release of automatic brakes acting in combination with terrain. A first trace 710 extending across the display screen represents track curvature, while a second trace 712 across the screen provides a visual representation of track grade profile. A train, approximately one mile long, is depicted by a trace 714 superimposed upon grade line 712. Vertical mile post indicators 304 bear a sequential caption 378-381 in ascending order from left to right. The town name "Mena" is displayed at mile post indicator 380.

A car coupler force trace 716 illustrates that the train is drifting along the decline after mile post 378 toward mile post 379. The locomotive throttle is set in notch 3. As indicated by a brake cylinder pressure trace 718, a minimum service brake application was previously made and is now in the process of being released. Brake cylinder pressure trace 718 indicates a brake pressure of approximately 15 psi at the caboose which gradually tapers toward zero pressure at the front of the train. Car coupler force trace 716 indicates that cars in the rear fifth of the train are still run-in, while the cars immediately ahead have just been run-out as indicated by transient force 719 having a peak value of approximately 80,000 pounds. Average acceleration (0.6 mph/min) and simulated time (00:08:19) are also displayed.

Figure 15:
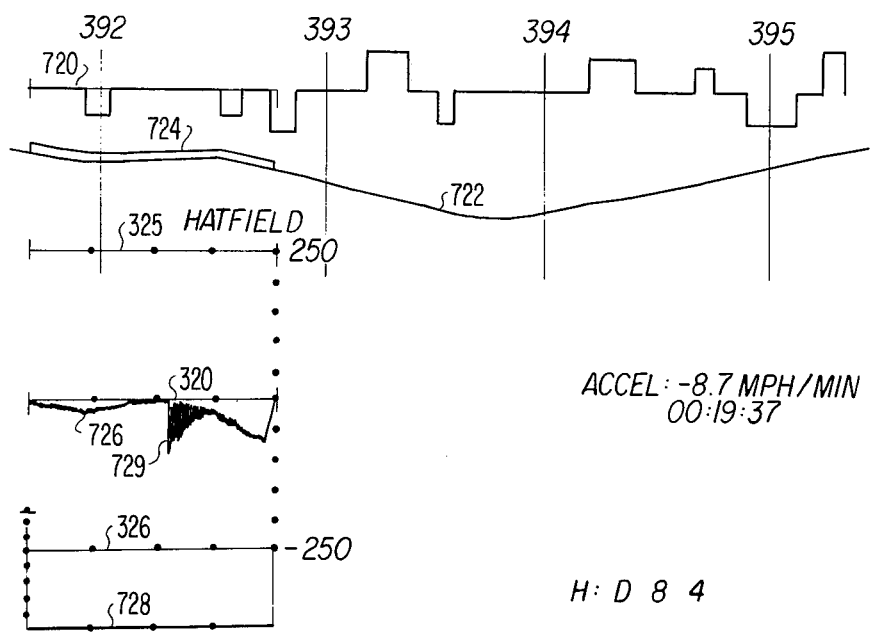

The example of FIG. 15 is a simple run-in event caused by a dynamic brake application. Vertical mile post indicators 304 bear a sequential caption 392-395 in ascending order and represent physical mile posts along a predetermined route of travel to be simulated. A first trace 720 extending horizontally across the display screen represents track curvature, and a second trace 722 across the screen provides a visual representation of track grade profile. A train, approximately one mile long, is depicted by a trace 724 superimposed upon grade line 722. The town name "Hatfield" is displayed between mile post indicators 392 and 393. The train is shown on a generally descending grade.

A car coupler force trace 726 indicates that most of the train is bunched since the force distribution is mostly below zero force line 320. A brake pressure trace 728 illustrates that the automatic brakes are released. In addition, the display "H : D B 4" shows that the locomotives are in dynamic braking with the brake control set in position 4. The train is decelerating at an average rate of 8.7 mph per minute. Car coupler force trace 726 shows that a few cars near the center of the train are still being run-in developing a transient compressive force 729 having a peak value of approximately 100,000 pounds. Simulated time (00:19:37) is also displayed.

Figure 16:
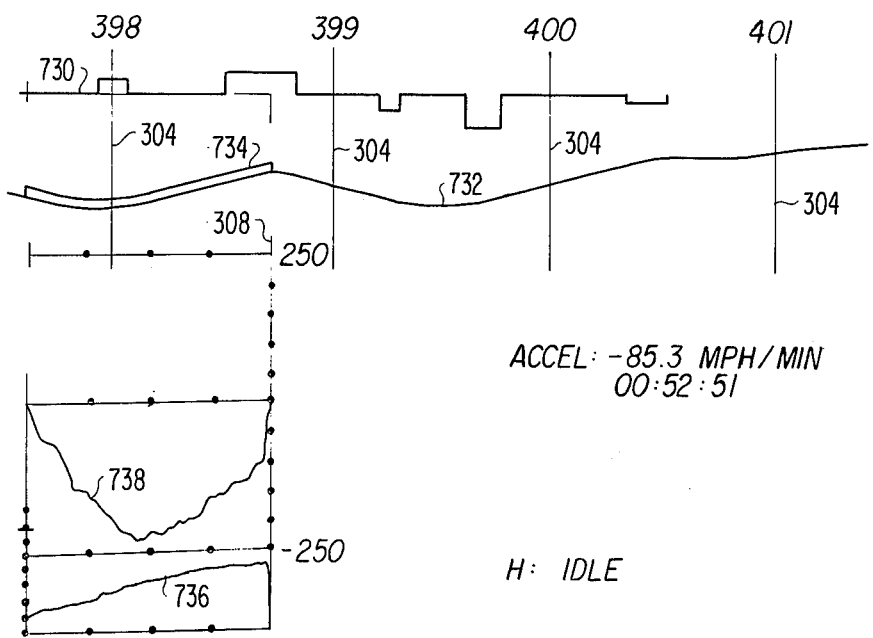

The example of FIG. 16 illustrates an emergency brake application. Vertical mile post indicators 304 bear a sequential caption 398-401 representing physical mile posts along a predetermined route of travel to be simulated. A first trace 730 extending horizontally across the display screen represents track curvature, and a second trace 732 across the screen provides a visual representation of track grade profile. A train, approximately one mile long, is depicted by a trace 734 superimposed upon grade line 732.

As indicated by grade line 732, the train is located in a dip at mile post 398. The locomotive engines are in idle, possibly as a result of opening of the pneumatic control switch (PCS). An average deceleration of 85.3 mph per minute is displayed along with simulated time (00:52:51). A brake cylinder pressure trace 736 indicates an increase in brake cylinder pressure to about 40 psi at the head of the train and about 12 psi at the caboose. A car coupler force trace 738 illustrates that severe compressive forces, e.g., approximately 225,000 pounds, are developed near the middle of the train. The car coupler force trace also indicates that the locomotive automatic brakes have not been released because of the sharp increase in compressive force at the head of the train. The large compressive force at the middle of the train could have been reduced by release of the locomotive automatic brakes.

The example of FIG. 16 illustrates the operation of a train equipped with remote controlled locomotives. Vertical mile post indicators 304 bear sequential caption 390-393 representing physical mile posts along a predetermined route of travel to be simulated. A first trace 740 extending horizontally across the display screen represents track curvature, and a second trace 742 across the screen provides a visual representation of track grade profile. A train, slightly more than one mile long, is depicted by a trace 744 superimposed upon grade line 742. The town name "Hatfield" is displayed between mile post indicators 392 and 393.

Figure 17:
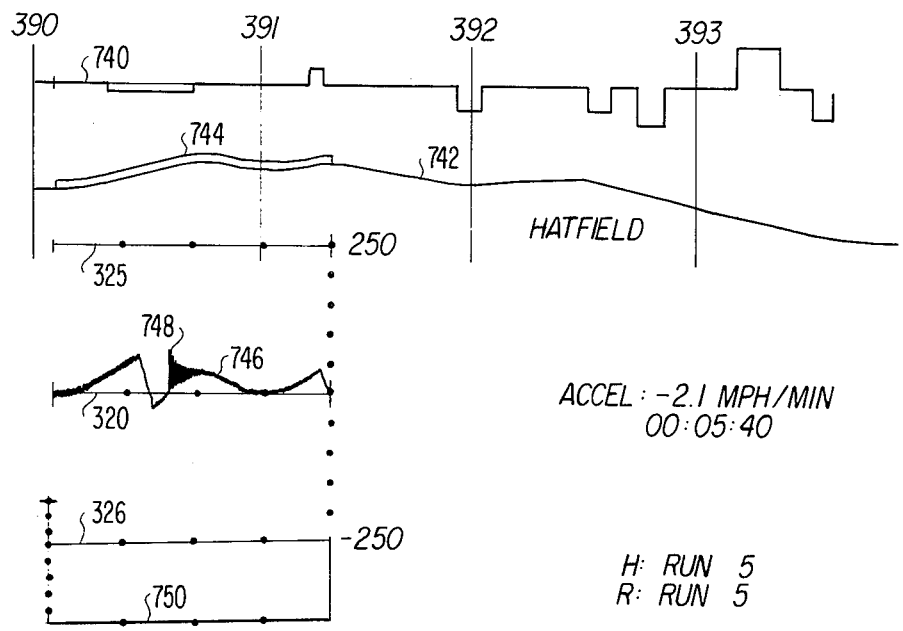

The train illustrated in FIG. 17 includes 150 cars with four locomotives located at the head and six locomotives located about 50 cars from the rear. As indicated by the displays "H : RUN 5" and "R : RUN 5," both the head-end engines and the remote controlled engines are operated with the throttle set in notch 5.

A car coupler force trace 746 illustrates that most of the train is in tension because most of the trace is above zero force line 320. A few cars ahead of the remote controlled locomotives are in compression and a run-out is in progress a illustrated by a transient force 748 having a peak value of approximately 75,000 pounds. A brake cylinder pressure trace 750 illustrates that the brakes are not applied. An average deceleration of 2.1 mph per minute is displayed along with simulated time (00:05:40).

Figure 18:
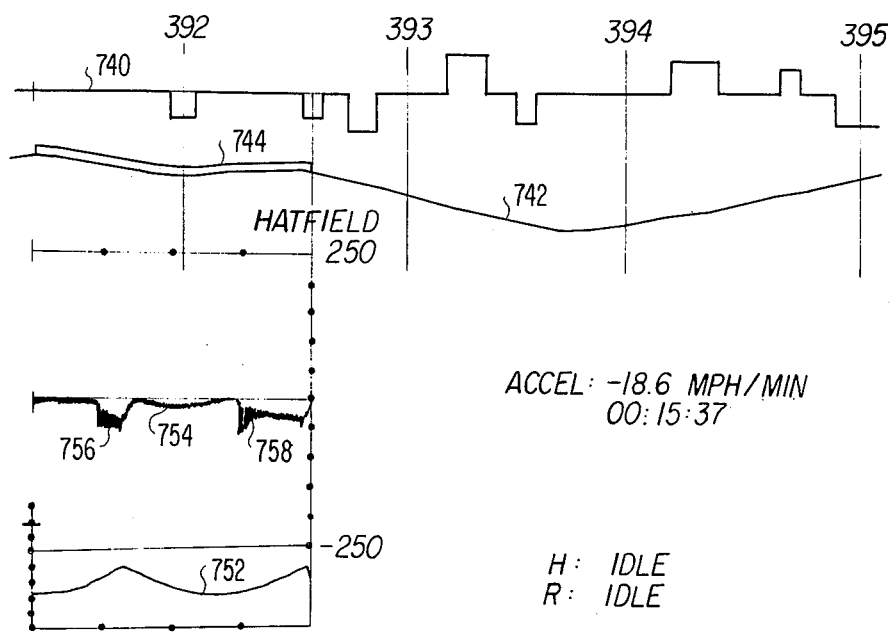

The example of FIG. 18 illustrates a full service brake application in connection with the same train illustrated in FIG. 15. As shown in FIG. 16, the train has moved to a position between mile post indicators 392 and 393. A brake cylinder pressure trace 752 illustrates a brake cylinder pressure of about 40 psi at the head of the train and at the remote locomotivess, while the brake cylinder pressures are only about 22 psi at the rear of the train and about one-third back from the head. Both the head and remote locomotives are operated with the throttle set in the idle position.

A car coupler force distribution trace 754 illustrates that the locomotive brakes have not been released because of the sharp increases in compressive force at the head and remote locomotives. As shown by the car coupler force distribution, two run-ins are in progress, one at the rear of the remote locomotives indicated by transient force 756 and another about one-fourth back from the head of the train indicated by transient force 758.

The above examples are not intended to be exhaustive but merely illustrative of the types of simulations which may be achieved by the simulator of the present invention. The simulations enable the control station operator to analyze potential difficulties which may be encountered along predetermined routes of travel and to formulate appropriate corrective action to obtain the desired coupler force distribution throughout the train.

Summary of Major Advantages of the Invention

The present invention achieves a unique and highly advantageous method and apparatus for simulating operation and control of a railway train.

The invention facilitates simulation of the operational control of a railway train to enable optimum train operations to be determined by railway personnel. The display of car coupling forces and brake pressure distribution in response to operation of the control stand facilitates training of personnel to achieve safe and reliable operation of a train to minimize the tendency for train partings and derailments.

By allowing train handling operations to be simulated over predetermined routes of travel having a widely varying terrain and with trains of widely varying consists, the simulator enables even a relativey inexperienced engineman to be trained to effectively handle long trains over unfamiliar routes. The engineman can also learn to improve train performance with reduced fuel consumption by optimizing utilization of grades to achieve speed maintenance of the train.

By recording track profiles over actual routes of travel, the simulator enables optimum train handling procedures to be determined for operations over known sections of railroad track. Since the train consist can be easily varied, the simulator enables railway personnel to examine different train consists to determine the desirable weight distribution along the length of the train.

By allowing simulation of train operations with remote locomotives, the simulator enables railway personnel to determine the optimum location of slave locomotives along the length of the train. Further, the simulator can be advantageously employed to recreate actual operating conditions to assist in the investigations of train derailments.

While the invention has been described with reference to a preferred embodiment, it will be appreciated by those skilled in the art that additions, deletions, modifications and substitutions or other changes not specifically described may be made which will fall within the purview of the amended claims.

What is claimed is:

1. A method for simulating operation and control of a railway train having at least one manually operated locomotive in a locomotive set and a plurality of cars, each car of the plurality of cars having a coupler transmitting a coupling force between it and that portion of the train which precedes it in the train, comprising the steps of:
    a. providing a simulator control station including a train speed control throttle and a train braking controller each providing a signal related to the degree of operation thereof by a simulator control station operator;
    b. providing data related to track profile, train consist, and the location of the train on the track for a predetermined train and for a predetermined section of track over which the operation of the train is to be simulated;
    c. providing data related to locomotive tractive effort and train braking in response to the signals from the control throttle and the train braking controller;
    d. calculating from the provided data the coupling forces between each of a plurality of adjacent cars in the train; and
    e. displaying to the simulator control station operator each of a plurality of the calculated coupling forces relative to the position in the train of the cars for which the calculations were made whereby operation and control of the railway train is simulated.

2. A method according to claim 1 including the step of displaying to the simulator control station operator a representation of the brake pressure distribution along the train.

3. A method according to claim 1 including the step of operating the throttle and brake controller in response to the displayed coupling forces to simulate control of the operation of at least one locomotive.

4. A method according to claim 1 including the step of selectively displaying to the simulator control station operator a representation of the train consist.

5. A method according to claim 1 including the step of displaying to the simulator control station operator a representation of the track profile and simulated presence of the train on the track.

6. A method according to claim 1 including the step of displaying to the simulator control station operator an indication of the degree of operation of the train speed control throttle.

7. An apparatus according to claim 1 including means for selectively displaying to the simulator control station operator a representation of the train consist.

8. A method of simulating operation and control of a railway train having at least one locomotive in a locomotive set and a plurality of cars, each car of the plurality of cars having a coupler transmitting a coupling force between it and that portion of the train which precedes it in the train, comprising the steps of:
 a. providing a simulator control station including a train speed control throttle and a train braking controller each providing a signal related to the degree of operation thereof by a simulator control station operator;
 b. providing simulator data related to track profile, train consist, locomotive tractive effort, train braking and the location of the train on the track for a predetermined simulation;
 c. calculating from the provided simulator data the coupling forces between each of a plurality of adjacent cars in the train; and,
 d. operating the throttle and the braking controller to modify at least some of the simulator data in response to the calculated coupling forces to simulate control of the operation of at the least one locomotive.

9. A method according to claim 8 including the step of displaying to the simulator control station operator each of a plurality of the calculated coupling forces relative to the position in the train of the cars for which the calculations were made whereby operation and control of the railway train is simulated.

10. A method according to claim 9 including the step of displaying to the simulator control station operator an representation of the train brake application.

11. A method according to claim 10 which includes the step of displaying simulated time to the simulator control station operator.

12. An apparatus according to claim 10 including means for displaying to the simulator control station operator a representation of the train brake application.

13. An apparatus for simulating operation and control of a railway train having at least one manually operated locomotive in a locomotive set and a plurality of cars, each car of the plurality of cars having a coupler transmitting a coupling force between it and that portion of the train which precedes it in the train, comprising:
 a. a simulator control station including a train speed control throttle and a train braking controller each providing a signal related to the degree of operation thereof by a simulator control station operator;
 b. means for providing data related to track profile, train consist, and the location of the train on the track for a predetermined train and for a predetermined section of track over which the operation of the train is to be simulated;
 c. means for providing data related to locomotive tractive effort and train braking in response to the signals from the control throttle and the train braking controller;
 d. means for calculating from the provided data the coupling forces between each of a plurality of adjacent cars in the train; and,
 e. means for displaying to the simulator control station operator each of a plurality of the calculated coupling forces relative to the position in the train of the cars for which the calculations were made whereby operation and control of the railway train is simulated.

14. An apparatus according to claim 13 including means for displaying to the simulator control station operator a representation of the brake pressure distribution along the train.

15. An apparatus according to claim 13 including means for displaying to the simulator control station operator a representation of the track profile and simulated presence of the train on the track.

16. An apparatus according to claim 13 including means for displaying to the simulator control station operator an indication of the degree of operation of the train speed control throttle.

17. An apparatus for simulating operation and control of a railway train having at least one locomotive in a locomotive set and a plurality of cars, each car of the plurality of cars having a coupler transmitting a coupling force between it and that portion of the train which precedes it in the train, comprising:
 a simulator control station including a train speed control throttle and a train braking controller each providing a signal related to the degree of operation thereof by a simulator control station operator;
 means for providing simulator data related to track profile, train consist, locomotive tractive effort, train braking and the location of the train on the track for a predetermined simulation;
 means for calculating from the provided simulator data the coupling forces between each of a plurality of adjacent cars in the train; and,
 said train speed control throttle and said train braking controller being operable to modify at least some of the simulator data in response to the calculated coupling forces to simulate control of the operation of at the least one locomotive.

18. An apparatus according to claim 17, wherein said simulator control station includes a remote locomotive control unit for controlling the operation of at least one slave locomotive in the simulated train.

19. An apparatus according to claim 17 including means for displaying to the simulator control station operator each of a plurality of the calculated coupling forces relative to the position in the train of the cars for which the calculations were made whereby operation and control of the railway train is simulated.

20. An apparatus according to claim 17 including means for displaying simulated time to the control station operator.

* * * * *

Disclaimer

4,041,283.—*John E. Mosier,* Duncan Okla. RAILWAY TRAIN CONTROL SIMULATOR AND METHOD. Patent dated Aug. 9, 1977. Disclaimer filed June 10, 1985, by the assignee, *Halliburton Co.*

Hereby enters this disclaimer to claims 1 through 20 of said patent.

[*Official Gazette August 27, 1985.*]